US010121122B2

(12) United States Patent
Russell et al.

(10) Patent No.: US 10,121,122 B2
(45) Date of Patent: Nov. 6, 2018

(54) TRACKING TRANSACTIONS BY CONFLUENCES AND SEQUENCES OF RFID SIGNALS

(71) Applicant: Amazon Technologies, Inc., Reno, NV (US)

(72) Inventors: Ryan Scott Russell, Bellevue, WA (US); Wesley Scott Lauka, Seattle, WA (US); Ned Lecky, Vashon, WA (US); Joshua Joel Boelter, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/265,801

(22) Filed: Sep. 14, 2016

(65) Prior Publication Data
US 2018/0150787 A1 May 31, 2018

Related U.S. Application Data

(63) Continuation of application No. 14/314,439, filed on Jun. 25, 2014, now Pat. No. 9,449,295.

(51) Int. Cl.
G06F 19/00 (2018.01)
G06Q 10/08 (2012.01)
(Continued)

(52) U.S. Cl.
CPC ....... G06Q 10/087 (2013.01); G06K 7/10316 (2013.01); G06K 9/00442 (2013.01); G06K 19/07758 (2013.01)

(58) Field of Classification Search
CPC .................. G06Q 10/087; G06Q 10/0833
(Continued)

(56) References Cited

U.S. PATENT DOCUMENTS

| | | | |
|---|---|---|---|
| 5,099,977 | A | 3/1992 | Hirose et al. |
| 6,366,242 | B1 | 4/2002 | Boyd et al. |

(Continued)

FOREIGN PATENT DOCUMENTS

| | | |
|---|---|---|
| JP | 2000286761 A | 10/2000 |
| JP | 2006165892 A | 6/2006 |

(Continued)

OTHER PUBLICATIONS

International Search Report and Written Opinion of PCT Application No. PCT/US2015/037287, dated Sep. 30, 2015.
(Continued)

Primary Examiner — Paultep Savusdiphol
(74) Attorney, Agent, or Firm — Athorus, PLLC

(57) ABSTRACT

An RFID device may include one or more manually activated RFID tags configured to transmit unique RFID signals in response to a manual activation thereof. A transaction may be defined upon receiving a confluence of multiple RFID signals at the same time, or at nearly the same time, at an RFID reader. A transaction may also be defined upon receiving multiple RFID signals or confluences of such signals in a predetermined series or sequence. The RFID devices may include a single manually activated RFID tag, or two or more of such tags, which may be individually activated by one or more manual interactions from a user.

21 Claims, 11 Drawing Sheets

(51) Int. Cl.
  *G06K 19/077* (2006.01)
  *G06K 7/10* (2006.01)
  *G06K 9/00* (2006.01)

(58) Field of Classification Search
  USPC .............................. 235/375, 376, 383, 385
  See application file for complete search history.

(56) References Cited

U.S. PATENT DOCUMENTS

| | | | |
|---|---|---|---|
| 6,531,964 B1 | 3/2003 | Loving | |
| 6,825,751 B1 | 11/2004 | Kita et al. | |
| 7,336,174 B1 | 2/2008 | Maloney | |
| 7,385,479 B1 | 6/2008 | Green et al. | |
| 8,169,303 B2 | 5/2012 | Hanebeck | |
| 8,482,412 B2 | 7/2013 | Majoros et al. | |
| 8,542,834 B1* | 9/2013 | Feikis | H04L 63/18 375/140 |
| 8,556,178 B2 | 10/2013 | Wang et al. | |
| 8,893,969 B2* | 11/2014 | Brandl | G06K 7/10059 235/380 |
| 9,405,948 B2 | 8/2016 | Schwiers et al. | |
| 2002/0067264 A1 | 6/2002 | Soehnlen | |
| 2002/0185542 A1 | 12/2002 | Wilz et al. | |
| 2003/0075608 A1 | 4/2003 | Atherton | |
| 2003/0136635 A1 | 7/2003 | Lauch | |
| 2003/0189493 A1 | 10/2003 | Klausner et al. | |
| 2004/0066296 A1 | 4/2004 | Atherton | |
| 2004/0118916 A1* | 6/2004 | He | G06K 7/0004 235/383 |
| 2004/0119605 A1 | 6/2004 | Schaper | |
| 2005/0149226 A1* | 7/2005 | Stevens | B65G 1/1371 700/214 |
| 2005/0174241 A1 | 8/2005 | Olsen | |
| 2005/0183990 A1 | 8/2005 | Corbell | |
| 2005/0200476 A1* | 9/2005 | Forr | G06Q 30/00 340/539.13 |
| 2005/0203798 A1* | 9/2005 | Jensen | G06Q 30/0201 705/14.41 |
| 2005/0219050 A1 | 10/2005 | Martin | |
| 2005/0234774 A1* | 10/2005 | Dupree | G06Q 30/02 705/14.57 |
| 2005/0243784 A1* | 11/2005 | Fitzgerald | G06Q 30/00 370/338 |
| 2005/0284941 A1 | 12/2005 | Lubow | |
| 2006/0044110 A1 | 3/2006 | Napolitano | |
| 2006/0119481 A1 | 6/2006 | Tethrake et al. | |
| 2006/0145880 A1 | 7/2006 | Chi et al. | |
| 2006/0186201 A1 | 8/2006 | Hart | |
| 2006/0187061 A1 | 8/2006 | Colby | |
| 2006/0244593 A1 | 11/2006 | Nycz et al. | |
| 2006/0284839 A1 | 12/2006 | Breed et al. | |
| 2007/0018832 A1 | 1/2007 | Beigel et al. | |
| 2007/0021197 A1 | 1/2007 | Frerking | |
| 2007/0030151 A1* | 2/2007 | Morrow | B29C 45/14 340/572.1 |
| 2007/0057469 A1 | 3/2007 | Grauzer et al. | |
| 2007/0075148 A1 | 4/2007 | Usami | |
| 2007/0075861 A1 | 4/2007 | Cook et al. | |
| 2007/0083283 A1 | 4/2007 | Ara et al. | |
| 2007/0096906 A1 | 5/2007 | Lyons et al. | |
| 2007/0100677 A1 | 5/2007 | Boss et al. | |
| 2007/0109101 A1 | 5/2007 | Colby | |
| 2007/0126578 A1 | 6/2007 | Broussard | |
| 2007/0136218 A1 | 6/2007 | Bauer et al. | |
| 2007/0152829 A1 | 7/2007 | Lindsay et al. | |
| 2007/0164863 A1 | 7/2007 | Himberger et al. | |
| 2007/0175972 A1 | 8/2007 | Ringer | |
| 2007/0296599 A1 | 12/2007 | Wang et al. | |
| 2008/0093176 A1 | 4/2008 | Rosenthal | |
| 2008/0113767 A1 | 5/2008 | Nguyen et al. | |
| 2008/0185265 A1 | 8/2008 | Alemany et al. | |
| 2008/0284604 A1 | 11/2008 | Rubinstein | |
| 2008/0297324 A1 | 12/2008 | Tuttle | |
| 2009/0033463 A1 | 2/2009 | Posamentier | |
| 2009/0085721 A1 | 4/2009 | Dishongh | |
| 2009/0167699 A1 | 7/2009 | Rosenblatt et al. | |
| 2009/0309086 A1 | 12/2009 | Behan et al. | |
| 2010/0063652 A1 | 3/2010 | Anderson | |
| 2010/0097195 A1* | 4/2010 | Majoros | G06K 7/0008 340/10.6 |
| 2010/0114426 A1 | 5/2010 | Boss et al. | |
| 2010/0123581 A1* | 5/2010 | Hatfield | G06K 19/07345 340/572.3 |
| 2010/0171592 A1 | 7/2010 | Kamemaru | |
| 2010/0177993 A1 | 7/2010 | Chen | |
| 2010/0271187 A1 | 10/2010 | Uysal et al. | |
| 2010/0308964 A1* | 12/2010 | Ackley | H04B 5/0031 340/10.1 |
| 2010/0308975 A1 | 12/2010 | Gregersen et al. | |
| 2010/0312606 A1 | 12/2010 | Gala | |
| 2011/0163850 A1* | 7/2011 | Bachman | G06K 19/0702 340/10.1 |
| 2011/0227748 A1 | 9/2011 | Schaible et al. | |
| 2011/0266342 A1 | 11/2011 | Forster | |
| 2011/0285507 A1 | 11/2011 | Nelson | |
| 2012/0299703 A1 | 11/2012 | Chen | |
| 2013/0027191 A1 | 1/2013 | Wilkinson | |
| 2013/0218511 A1 | 8/2013 | Mager et al. | |
| 2013/0314207 A1 | 11/2013 | Yonekura et al. | |
| 2013/0342349 A1 | 12/2013 | Cruz | |
| 2014/0002113 A1 | 1/2014 | Schediwy et al. | |
| 2014/0012161 A1 | 1/2014 | Ross | |
| 2014/0061303 A1* | 3/2014 | Brandl | G06K 7/10059 235/385 |
| 2014/0061382 A1* | 3/2014 | Tucker | G07C 5/008 244/1 R |
| 2014/0111333 A1 | 4/2014 | Haas | |
| 2014/0121903 A1 | 5/2014 | Lee | |
| 2014/0148988 A1 | 5/2014 | Lathrop et al. | |
| 2014/0176307 A1* | 6/2014 | Forster | G06K 19/07345 340/10.4 |
| 2014/0186219 A1 | 7/2014 | Yukimoto | |
| 2014/0232519 A1 | 8/2014 | Allen et al. | |
| 2015/0357948 A1 | 12/2015 | Goldstein | |
| 2015/0360567 A1 | 12/2015 | Sannomiya et al. | |

FOREIGN PATENT DOCUMENTS

| | | |
|---|---|---|
| JP | 2007286965 A | 11/2007 |
| JP | 2011529721 A | 12/2011 |
| WO | 2010014331 A1 | 2/2010 |
| WO | 2014093968 A1 | 6/2014 |

OTHER PUBLICATIONS

International Search Report and Written Opinion of PCT Application No. PCT/US2015/056779, dated Jan. 19, 2016.
Sample, A.P "A Capacitive Touch Interface for Passive RFID tags", 2009 IEEE International Conference on RFID, pp. 103-109.
International Search Report for International Application No. PCT 2015/037531 dated Sep. 25, 2015.
Office Action for Japanese Patent Application No. 2016-570836 dated Aug. 28, 2017.

* cited by examiner

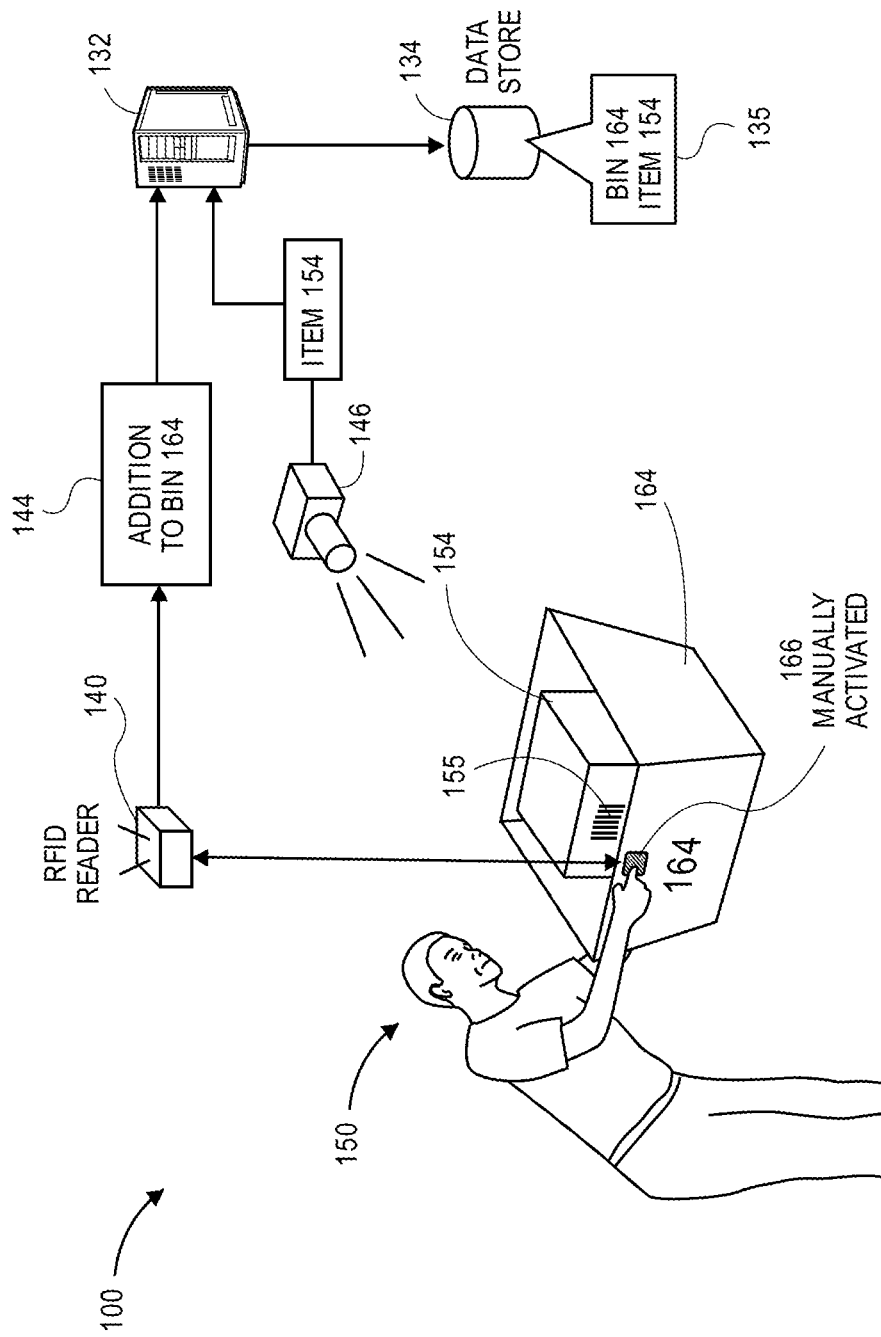

TRACKING TRANSACTIONS BY CONFLUENCES AND SEQUENCES OF RFID SIGNALS

CROSS-REFERENCE TO RELATED APPLICATIONS

This application is a continuation of U.S. patent application Ser. No. 14/314,439, filed Jun. 25, 2014, the contents of which are incorporated by reference herein in their entirety.

BACKGROUND

Online marketplaces frequently maintain inventories of items in one or more storage or distribution facilities, which are sometimes called fulfillment centers. Such facilities may include stations for receiving shipments of items, stations for storing such items, and/or stations for preparing such items for delivery to customers. For example, when a vendor delivers an inbound shipment of items to a fulfillment center, the shipment may arrive at a receiving station, where the items included in the shipment may be removed from the containers in which they arrived and transported to one or more storage areas within the fulfillment center by human workers or machines (e.g., one or more autonomous mobile robots). Likewise, when an online marketplace receives an order for one or more items from a customer, the items may be retrieved from their respective storage areas within the fulfillment center and transported to a distribution station, where the items may be prepared for delivery to the customer in an appropriate container with a suitable amount or type of dunnage, also by one or more machines or workers. Alternatively, where demand for an item already exists at a time when the item arrives at the fulfillment center, the item may be transported directly from the receiving station to the distribution station, or "cross-docked," for prompt delivery to the customer.

Thus, a lifecycle of an item within a fulfillment center may be defined based on the various interactions between the item and one or more objects, humans, machines or structures in various locations. A status of the item within the fulfillment center may be determined based on whether, where and how recently a machine or a worker has interacted with an item, which may be referenced in terms of one or more transactions. For example, one transaction involving an item may occur when a worker removes a container including the item from a truck or other carrier arriving at a receiving station, while another transaction may occur when a worker removes the item from the container. Still other transactions may occur when a worker stows the item in a predetermined region of a storage area, retrieves the item from the predetermined storage region or transports the item to a destination station.

A modern fulfillment center frequently maintains a fast-paced, high volume sales environment where items may arrive or depart, and may be placed in storage or retrieved, at very high rates of speed. Therefore, promptly and accurately confirming the physical (e.g., locations, statuses or conditions of items within one or more item carriers or storage facilities within the fulfillment center) and the virtual parity (e.g., records regarding such locations, statuses or conditions) within a fulfillment center environment is of paramount importance. Presently, information regarding a transaction involving an item may be captured and stored using one or more computers or computer-related devices.

For example, items which arrive at, are stored in or depart from a fulfillment center, and the various item carriers or storage facilities within the fulfillment center, are commonly adorned with one or more optically readable identifiers or markings, such as a one-dimensional or two-dimensional bar code (e.g., a "QR" code), and workers or machines within the fulfillment center may be equipped with one or more scanners or readers that may decode the information associated with such identifiers or markings, and thereby register the presence of the items or their respective item carriers or storage facilities, or their association with a given transaction, at a particular time. In this regard, a bar code or other identifier on an item may be scanned or read upon an arrival of the item at the fulfillment center, when the item is stowed in a storage facility, when the item is retrieved from the storage facility and placed into an item carrier, or when the item arrives at a distribution station.

Because such fulfillment centers may span hundreds of thousands of square feet, and receive, store or distribute millions of items to tens of millions of customers, capturing and storing information regarding the various transactions involving such items or orders therefor is an arduous and time-consuming task. For example, most bar code scanners or readers are handheld devices, which thereby require a worker to aim a scanner or reader at a first bar code affixed to an item, activate the scanner or reader a first time, wait for the first bar code to be registered and/or decoded, then aim the scanner or reader at a second bar code affixed to an item carrier or storage facility and activate the scanner or reader a second time, with information regarding the transaction being recorded only upon the registration or decoding of the second bar code. Alternating back and forth between carrying an item, manipulating a scanner or reader, placing the item in an item carrier or storage facility, and manipulating the scanner or reader again may therefore create insuperable delays in the fulfillment process.

BRIEF DESCRIPTION OF THE DRAWINGS

FIGS. 1A, 1B and 1C are views of one system for tracking transactions by confluences and sequences of RFID signals, in accordance with embodiments of the present disclosure.

DETAILED DESCRIPTION

As is set forth in greater detail below, the present disclosure is directed to the tracking of transactions or occurrences based on detected or observed commonalities, or confluences, of signals received from two or more radio frequency identification (or "RFID") tags or sources associated with various entities, e.g., objects, humans, machines or structures, or on sequences of such confluences or such signals. Specifically, the systems and methods disclosed herein are directed to simultaneously or nearly simultaneously capturing signals from a predetermined number of RFID tags, such as an RFID tag associated with a worker or an autonomous mobile robot, an RFID tag associated with an item or an RFID tag associated with a given location, and capturing and storing information regarding a transaction or occurrence based on a confluence of such signals. The systems and methods disclosed herein are further directed to capturing sequences of signals received from any number of RFID tags, or sequences of confluences of signals received from multiple RFID tags, and capturing and storing information regarding a transaction or occurrence based on such sequences.

Figure 1A:
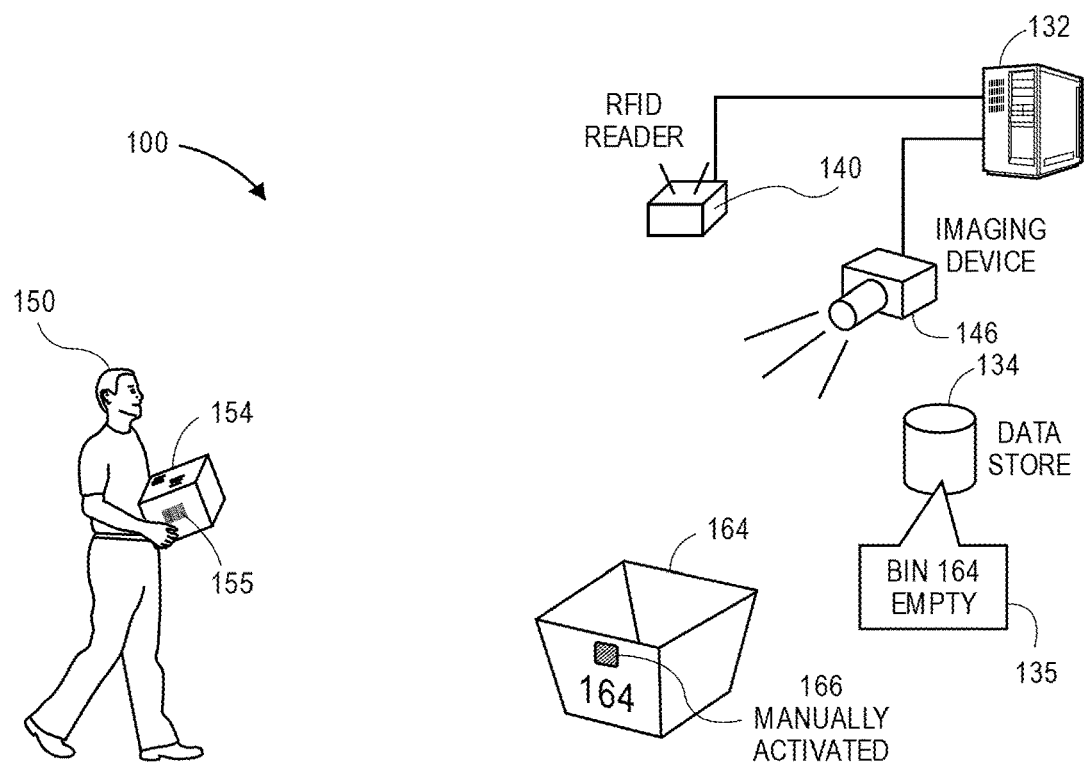
Figure 1B:
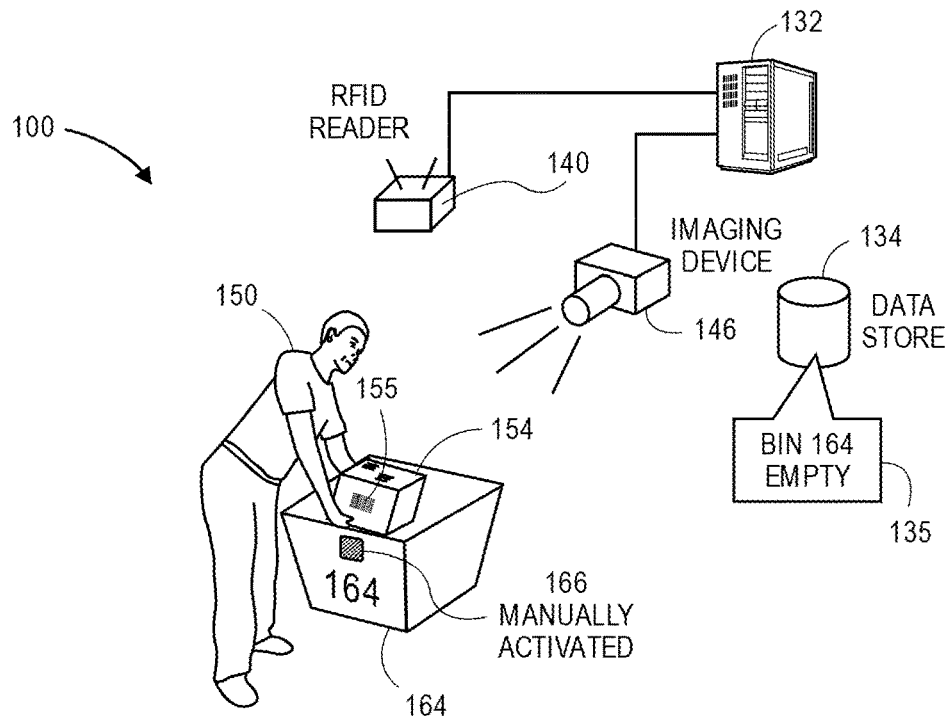

Referring to FIGS. 1A, 1B and 1C, a system 100 for tracking transactions by confluences and sequences of RFID signals is shown. As is shown in FIGS. 1A and 1B, the system 100 includes a computing device 132, a data store 134, an RFID reader 140, an imaging device 146, a worker 150 and a storage facility (e.g., a bin) 164. The data store 134 includes a record 135 containing information regarding contents of the storage facility 164. The RFID reader 140 and the imaging device 146 are provided in a vicinity of the storage facility 164, and in communication with the computing device 132, with the storage facility 164 within a field of view of the imaging device 146. As is shown in FIG. 1A, the worker 150 is carrying an item 154 bearing a bar code 155, and as is shown in FIG. 1B, the worker 150 places the item 154 in the storage facility 164. The imaging device 146 is configured to capture imaging data regarding one or more marked identifiers on objects, e.g., the bar code 155 on the item 154, and to provide the imaging data to the computing device 132, where the imaging data may be processed in order to identify the item 154. Additionally, a manually activated RFID tag or device 166 is mounted to an external surface of the storage facility 164.

According to the systems and methods disclosed herein, information regarding one or more transactions may be recorded upon receiving a predetermined RFID signal, a predetermined confluence of RFID signals, or a predetermined sequence of RFID signals or confluences of RFID signals, by an RFID reader. In particular, one or more of the RFID signals may be received from a manually activated RFID tag or device. As is shown in FIG. 1C, after placing the item 154 into the storage facility 164, the worker 150 manually activates (e.g., touches) the manually activated RFID tag or device 166, thereby causing an RFID signal to be transmitted from the manually activated RFID tag or device 166 to the RFID reader 140. Accordingly, when the RFID signal is received by the RFID reader 140 from the manually activated RFID tag 166 on the storage facility 164, and after the item 154 has been identified based on the bar code 155, information regarding a transaction, viz., a data packet or file 144 indicating that the item 154 has been added to the bin 164, is transmitted to the computing device 132, which may update a record 135 maintained in the data store 134 containing information regarding the contents of the bin 164 to indicate that the item 154 has been placed therein, along with any other relevant information or data, e.g., a date or time at which the item 154 has been placed in the storage facility 164. The record 135 containing information regarding the contents of the bin 164 may be processed and/or stored, and used for any relevant purpose.

By capturing and storing information associated with the receipt of an RFID signal, or the simultaneous or nearly simultaneous receipt of RFID signals, e.g., the receipt of signals at the same time or within a predetermined time interval, from one or more RFID tags or devices, or predetermined combinations of RFID tags or devices, that are applied to objects, humans, machines or structures, the systems and methods of the present disclosure enable more accurate and efficient recording and auditing of information regarding physical and virtual transactions involving such objects, humans, machines or structures. Specifically, as is shown in FIGS. 1A-1C, based on the RFID signal received from the manually activated RFID tag or device 166 on the storage facility 164, the computing device 132 identified the storage facility 164 based on the RFID signal and received an identification of the item 154 by way of the imaging device 146. Subsequently, information indicating that the item 154 has been deposited into the storage facility 164, along with any other relevant information or data, e.g., a date and time at which the item 154 was placed in the storage facility 164, or an identity of the worker 150, may be stored in the data store 134. Such information may be utilized in real time or in near-real time to update a status of the worker 150, the item 154 or the storage facility 164, e.g., to indicate that the item 154 has been placed into the storage facility 164, that the storage facility 164 contains a certain number of items, or that the worker 150, the item 154 or the storage facility 164 is in any other state.

Alternatively, the systems and methods of the present disclosure may be configured to identify confluences or sequences of RFID signals received from one or more RFID tags or devices, e.g., a plurality of manually activated RFID tags or devices, which may be independently touched or otherwise contacted in series in order to cause signals to be transmitted from such tags, also in series, to the RFID reader. Thus, the receipt of RFID signals from RFID tags in a given order or within a predetermined interval of time by the RFID reader 140 may cause information regarding the stowing of the item 154 into the storage facility 164 by the worker 150 to be transmitted by the computing device 132 to the data store 134 and stored in one or more records maintained therein. The systems and methods of the present disclosure may therefore capture and store information regarding a transaction based upon a detection of one or more confluences of RFID signals, as well as sequences of RFID signals or sequences of confluences of such signals.

RFID refers to a wireless, non-contacting system for transferring data by way of radio frequency electromagnetic fields. In an RFID system, data transfers occur in the form of modulated signals transmitted between an RFID tag (or an RFID device), which may include various communication components, logic or circuitry, and an RFID reader, which may include antennas or other like devices. Data stored within a microchip or other storage device associated with the RFID tag may be sent to the RFID reader, which may interpret not only the data received in the RFID signal but also other relevant information or attributes of the RFID signal, such as an intensity or a frequency of the RFID signal, as well as a direction from which the RFID signal originated, a range traveled by the RFID signal or at least some of the information or data included in the RFID signal. The transfer of the RFID signal is initiated when an electric field or a magnetic field transmitted by an RFID reader is sensed by an RFID tag, which transmits information or data that may be stored in association with the RFID tag in one or more microchips or other storage devices.

RFID systems provide a number of advantages over similar systems for the short-range transfer of information or data. First, an RFID tag may be formed of components having remarkably small, compact shapes and sizes, and tags that are as thin as a sheet of paper or smaller than a grain of rice are quite common. Additionally, unlike a bar code (e.g., a one-dimensional bar code or a two-dimensional "QR" code), an RFID tag need not be provided within a line of sight of an RFID reader in order to successfully transmit data. Therefore, RFID tags may be concealed or embedded into many different types of objects of any size or shape, as well as humans or other animals. Next, an RFID tag may be programmed with a fixed set or packet of "read-only" data which may be transmitted to an RFID reader countless number of times in theory, or reprogrammed with modifiable sets of data that may be written and rewritten, as needed, based on the application in which the RFID tag is provided. Moreover, and perhaps most importantly, while an active RFID tag includes and utilizes a local power source, such as a battery, a passive RFID tag does not require any power in order to successfully transmit a set or packet of data to an RFID reader, and may therefore transmit such data when power supplies are unavailable or in environments where providing power to the RFID tag is infeasible.

RFID signals may be transmitted from an RFID tag to an RFID reader in many different formats and at many different frequency levels. An RFID tag that transmits signals within low frequency (LF), medium frequency (MF) or high frequency (HF) levels (e.g., approximately 3 kilohertz to 30 megahertz, or 3 kHz-30 MHz) may transfer relatively small-sized sets or packets of data over short ranges (e.g., between ten and one hundred centimeters, or 10-100 cm). Other RFID tags may transmit signals at higher frequency levels, such as ultrahigh frequency (UHF) or microwave levels (e.g., approximately 300 megahertz to 300 gigahertz, or 300 MHz-300 GHz) including larger sets or packets of data at ranges of one meter (1 m) or longer.

A signal transmission from an RFID tag to an RFID reader may be achieved in any number of ways. An inductively coupled RFID tag is an RFID tag that is powered by energy obtained from magnetic fields generated by an RFID reader, and may be coupled to the RFID reader using this energy. In this regard, an RFID reader may include one or more coils through which an electric current may pass, thereby causing a magnetic field to be generated by the RFID reader according to Ampere's Law. Likewise, an inductively coupled RFID tag may also include one or more coils. When the RFID tag passes within a particular range of the RFID reader, an electric current is generated within the coils of the RFID tag, thereby coupling the RFID reader and the RFID tag based on the magnetic flux passing through the respective sets of coils. The electric current passing through the coils of the RFID tag may then power internal circuits within the RFID tag, and cause an RFID signal to be transmitted from the RFID tag to the RFID reader accordingly. Thus, inductively coupled RFID tags are commonly used in powerless environments where a passive system for transmitting signals may be required.

Additionally, an RFID tag may be coupled by any number of other modes. For example, capacitively coupled RFID tags include coupling plates that are designed to correspond to a plate of an RFID reader. When the RFID tag is placed in sufficiently close proximity to the RFID reader, thereby causing the corresponding coupling plates of the RFID tag and the RFID reader to be aligned in parallel with one another and within a short range, a transfer of data from the RFID tag to the RFID reader is achieved. Unlike an inductively coupled RFID tag, which is powered by a magnetic field generated by an RFID reader, a capacitively coupled RFID tag is powered by an alternating electric field generated by an RFID reader. For this reason, capacitively coupled RFID tags usually have more limited operating ranges than inductively coupled RFID tags and are typically employed in near-field communication environments. Similarly, a backscatter-coupled RFID tag receives power emitted from an RFID reader's antenna. A portion of the emissions from the RFID reader are received by a corresponding antenna of the RFID tag and may be filtered or rectified, as necessary, in order to trigger a transfer of data from the RFID tag to the RFID reader. Any type or mode of coupling between an active, semi-active (e.g., powered on a temporary basis or for limited purposes) or passive RFID tag and an RFID reader may be utilized in accordance with the present disclosure.

In addition to RFID tags which are automatically coupled with an RFID reader, the systems and methods of the present disclosure may further include an RFID tag, such as a passive RFID tag, which may be manually activated, e.g., coupled upon a manual action, by a human or machine in order to cause a transmission of a data signal from the RFID tag to one or more RFID readers. A manually activated RFID tag may include physical or virtual switches that may close a circuit within the RFID tag and thereby permit the RFID tag to function as a data transmitter in the presence of an electric or magnetic field. For example, a manually activated RFID tag may include capacitive elements that define a capacitor within the RFID tag, and may effectively close a circuit within the RFID tag when such elements detect bioelectricity from a user. The term "bioelectricity" generally refers to electrical charges or electric field gradients that may be stored within a living body, such as a human body, which contains blood and other matter having a variety of positively and negatively charged ions (e.g., sodium, chloride and others). Bioelectricity within a body may cause a change in capacitance of such elements in a vicinity of a location touched by the body (e.g., a digit such as a finger or thumb), due to disruptions in electrical fields caused by the body's presence, thereby further causing a change in the time constant of the RFID tag, and a discharge of the capacitor in an amount that may be defined as a function of the resistance of the capacitive elements.

According to some embodiments, such capacitive elements may be formed into a layered stack or may include a substantially linear or planar gap or break, and may be covered with a flexible protective layer formed from one or more plastics or rubbers (e.g., acrylics, vinyls, polyurethanes or the like), or other like materials. The protective layer may be adhered to one or more capacitive elements of an RFID circuit, which may include elements formed from a conductive material such as aluminum, copper, silicon or indium tin oxide that are separated by an air gap. When a user touches a protective layer of an RFID tag with a finger, which is a bioelectric conductor, a change in the effective capacitance (on the order of approximately one picofarad) between the elements, which are also conductors, in a vicinity of a point or points of contact with the protective layer is introduced. Such contact forms a conductive bridge across the elements, thereby causing disruptions in electrical fields in the vicinity of one or more of the elements, and further causing an internal current flow through the RFID tag circuit.

In addition to capacitive elements, a circuit of an RFID tag may include other components for enabling a manual actuation thereof by a human or a machine, including one or more substantially planar conductive elements that may be separated by an air gap. Such an air gap between the conductive elements defines an open switch within the circuit of the RFID tag, which may also be covered with a flexible protective layer that may be formed from one or more plastics, rubbers or other like materials. When a user contacts an external surface of the RFID tag corresponding to the air gap, e.g., the flexible protective layer over the air gap, at least two of the conductive elements are placed in contact with one another, thereby bridging the air gap between the conductive elements and closing the open switch. Subsequently, an internal current flow through the RFID tag circuit is enabled. Because the bridging of the air gap and the closure of the open switch is registered by manually driven electrical contact, a manually activated RFID tag including substantially planar conductive elements does not require bioelectricity in order to operate properly, and a user may interact with the RFID tag using not only his or her fingers or hands (which may be gloved or ungloved) but also a stylus, a pointer or another like object.

The systems and methods of the present disclosure are directed to receiving unique RFID signals from a single RFID tag associated with a storage facility, or from multiple RFID tags on a simultaneous or nearly simultaneous basis, e.g., at the same time, or within a predetermined time interval of one another, wherein at least one of the RFID tags is associated with a storage facility, and capturing and storing information regarding the simultaneous or nearly simultaneous capture of such signals in at least one data store. More particularly, the systems and methods of the present disclosure are directed to recognizing a unique RFID signal transmitted by a single RFID tag, or a predetermined confluence or sequence of any number of unique RFID signals transmitted by multiple RFID tags, at one or more RFID readers, determining that a transaction has occurred based on the recognition of the RFID signal or RFID signals, and transmitting and/or storing information regarding the transaction in response to the recognition. The RFID tags by which such signals are transmitted or from which such RFID signals are received may be mounted to, embedded in or otherwise associated with one or more objects, humans, machines or structures, including but not limited to such objects, humans, machines or structures within any environment, e.g., a fulfillment center environment, or also worn or carried by a worker or an autonomous mobile robot within such an environment.

The systems and methods of the present disclosure are further directed to receiving one or more sequences of RFID signals, or sequences of confluences of RFID signals, from multiple RFID tags, and capturing and storing information regarding the sequences of such signals or the sequences of confluences of such signals in at least one data store. More particularly, the systems and methods of the present disclosure are directed to recognizing a predetermined number and/or type of RFID signals transmitted by multiple RFID tags or received at one or more RFID readers in a given sequence or order, including sequences of not only individual RFID signals received from individual RFID tags but also sequences of combinations or confluences of RFID signals simultaneously received from multiple RFID tags, determining that a transaction has occurred based on the recognition of the predetermined number and/or type of such signals, and transmitting and/or storing information regarding the transaction in response to the recognition. The sequences or confluences of RFID signals may be defined by any number of RFID signals transmitted by RFID tags may be of any type, including but not limited to active RFID tags and passive RFID tags, as well as manually activated RFID tags that may be provided in any environment.

Additionally, the unique RFID signals, the predetermined confluences of unique RFID signals or the sequences of unique RFID signals or confluences of such signals may be defined in advance based on RFID tags associated with specific objects, humans, machines or structures, or based on RFID signals transmitted by such objects, humans, machines or structures, as well as categories of such objects, humans, machines or structures. Each of the RFID tags may be configured to transmit a unique RFID signal comprising one or more unique combinations or strings of alphanumeric characters (e.g., letters or numbers), symbols or the like, including but not limited to lexicographic words, acronyms or phrases formed from such characters or symbols. For example, a transaction may be recorded when RFID signals are received from an RFID tag on a specific worker or autonomous mobile robot, from an RFID tag on a specific item and from an RFID tag on a specific machine, such as the tag 166 on the storage facility 164 of FIGS. 1A-1C, respectively, or when RFID signals are received from RFID tags associated with workers, items or machines of a given type or group. Moreover, the predetermined confluences may be defined based at least in part on the collection of signals from RFID tags that are sufficiently close to one another, which may be further determined based on attributes of the RFID signals such as a maximum angular or radial separation of directions or ranges of such signals, matched intensities or strengths of such signals, or information or data included in such signals.

Moreover, the systems and methods of the present disclosure may utilize apparatuses featuring multiple manually activated RFID tags including discrete RFID circuits that are capable of transmitting multiple independent RFID signals upon contact with each of such tags by a user. The multiple manually activated RFID tags may be provided in any orientation, configuration or layout, thereby enabling a user to identify and contact each of the RFID tags in order to transmit a specific RFID signal associated with a given RFID tag. For example, an array of manually activated RFID tags may be provided in the shape of a keyboard or keypad (e.g., a standard QWERTY keyboard, a keypad having keys corresponding to alphanumeric characters or other symbols, or any other arrangement), with each of the RFID tags configured to transmit different sets of information or data to an RFID reader. The surfaces of such manually activated RFID tags may include an external marking or identifier corresponding to the manually activated RFID tag, or otherwise identifying the information or data that is to be transmitted by the manually activated RFID tag upon contact. Because RFID tags may be formed into small shapes having substantially thin dimensions, such apparatuses may enable a keyboard or keypad-like device for providing information to be applied to many types or forms of surfaces using adhesives or other like materials. Thus, the systems and methods of the present disclosure may enable one or more workers or other users to enter information by contact with a sequence of one or more manually activated RFID tags, which need not require any form of power in order to successfully transmit the information to an RFID reader.

Additionally, an apparatus may further include two or more independent manually activated RFID tags that are provided in close proximity to one another, such that a worker or other user may transmit a sequence of RFID signals upon a single manual action, e.g., a swipe of a finger across the apparatus, which contacts two or more of the manually activated RFID tags within a finite interval of time, thereby causing a sequence of signals to be transmitted from each of the contacted tags to an RFID reader. For example, where two manually activated RFID tags are embedded between a common protective layer and substrate, and affixed to an object, a human, a machine or a structure, a worker or other user may manually activate each of the RFID tags with a single motion, e.g., a swipe, across the protective layer, and thereby cause a sequence of RFID signals to be transmitted to an RFID reader from each of the RFID tags in series upon contact with one another. The RFID reader may be configured to transmit information regarding the sequence of RFID signals to an external server or other computer system, which recognize that the swipe has occurred based on the information, and take one or more relevant actions in response to the information.

Where a predetermined confluence of unique RFID signals has been defined based on a particular combination of RFID tags associated with specific objects, humans, machines or structures, and the predetermined confluence of unique RFID signals is not detected or observed as scheduled, or where a different confluence of RFID signals is detected or observed, a transaction may be deemed to have failed to occur, and information regarding the failed transaction may be stored in at least one data store. Alternatively, if a confluence of signals that is different than that which was expected is detected or observed, information regarding the confluence of signals that was detected, and/or a failure to detect the expected confluence of signals, may also be captured and stored. Likewise, where a predetermined sequence of RFID signals and/or confluences of RFID signals has been defined based on a particular combination of RFID tags associated with specific objects, humans, machines or structures, and the predetermined sequence of RFID signals or confluences of RFID signals is not detected or observed as scheduled, or where a different sequence is detected or observed, a transaction may be deemed to have failed to occur, and information regarding the failed transaction may be stored in at least one data store.

Moreover, a manually activated RFID tag may act as a gateway or trigger which thereby causes or enables one or more other RFID signals, e.g., a single RFID signal transmitted by another RFID tag, or a confluence of RFID signals or sequence of RFID signals transmitted by multiple RFID tags, to be captured. For example, the receipt of an RFID signal from a manually activated RFID tag may effectively serve as an "on/off" switch which causes an RFID reader to capture and store any other RFID signals that may be transmitted by an RFID tags within a vicinity of the RFID reader at a time when the RFID signal was received. The capture and storage of such RFID signals may occur for a predetermined interval or period of time after the manually activated RFID tag was contacted, or until the manually activated RFID tag is contacted again. Thus, when a worker contacts a manually activated RFID tag in a vicinity of an RFID reader, an RFID signal transmitted by the manually activated RFID tag to the RFID reader may effectively open a window of time during which the RFID reader may capture other related or unrelated RFID signals of any type or number which may be transmitted from one or more nearby RFID tags.

In this regard, by exploiting the efficiency of RFID systems to quickly and effectively transmit and receive data signals transmitted from an RFID tag within a vicinity of an RFID reader, the systems and methods of the present disclosure may enhance the capacity of computer-based systems associated with networks of one or more RFID readers to capture and store information regarding transactions between objects, humans, machines or structures bearing RFID tags. The systems and methods disclosed herein may therefore capture and store information regarding a transaction characterized by a unique RFID signal received from a single RFID tag, a confluence of RFID signals simultaneously or nearly simultaneously received from a predetermined number and type of RFID tags, or sequences of RFID signals or confluences of such RFID signals, and only when such confluences or sequences are received, thereby minimizing the amount or extent of data that need be captured and stored in order to verify that the transaction has occurred, and also increasing the quality and relevance of the captured and stored information. Conversely, the systems and methods disclosed herein may also capture and store information regarding a failure of an intended transaction to occur as scheduled, or regarding an occurrence of a transaction other than the intended transaction, in order to subsequently determine why the intended transaction did not occur, or why the unintended transaction did occur.

Once information regarding a plurality of transactions has been captured and stored in accordance with the present disclosure, the information may be used for any purpose. For example, the information may be used to determine or update a real time or near-real time status of one or more objects, humans, machines or structures in various locations, e.g., an item arriving at a fulfillment center, such as the item 154 in the system 100 of FIGS. 1A-1C. Alternatively, the information may be used at a later time to identify, evaluate or audit one or more additional events or occurrences associated with such objects, humans, machines or structures, or to identify one or more entities associated with such events or occurrences, or dates or times at which such events or occurrences happened, thereby resulting in an enhanced level of quality of service and accountability.

Figure 2:
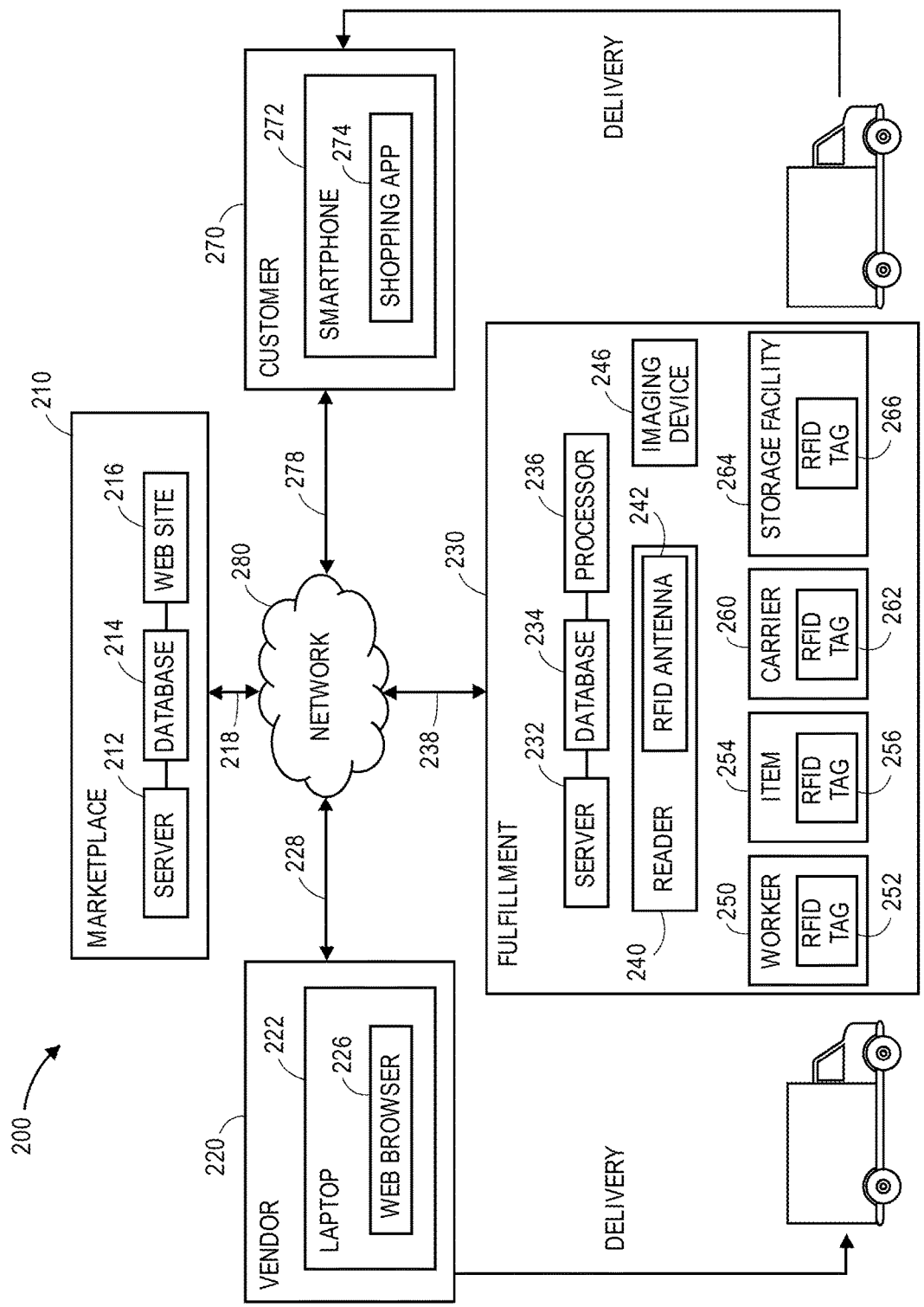
FIG. 2 is a block diagram of components of one system for tracking transactions by confluences and sequences of RFID signals, in accordance with embodiments of the present disclosure.

Referring to FIG. 2, a block diagram of one system 200 for tracking transactions by confluences or sequences of RFID signals is shown. The system 200 includes a marketplace 210, a vendor 220, a fulfillment center 230 and a customer 270 that are connected to one another across a network 280, such as the Internet.

The marketplace 210 may be any entity or individual that wishes to make items from a variety of sources available for download, purchase, rent, lease or borrowing by customers using a networked computer infrastructure, including one or more physical computer servers 212 and databases (or other data stores) 214 for hosting a web site 216. The marketplace 210 may be physically or virtually associated with one or more storage or distribution facilities, such as the fulfillment center 230. The web site 216 may be implemented using the one or more servers 212, which connect or otherwise communicate with the one or more databases 214 as well as the network 280, as indicated by line 218, through the sending and receiving of digital data. Moreover, the database 214 may include any type of information regarding items that have been made available for sale through the marketplace 210, or ordered by customers from the marketplace 210.

The vendor 220 may be any entity or individual that wishes to make one or more items available to customers, such as the customer 270, by way of the marketplace 210. The vendor 220 may operate one or more order processing and/or communication systems using a computing device such as a laptop computer 222 and/or software applications such as a web browser 226, which may be implemented through one or more computing machines that may be connected to the network 280, as is indicated by line 228, in order to transmit or receive information regarding one or more items to be made available at the marketplace 210, in the form of digital or analog data, or for any other purpose.

The vendor 220 may deliver one or more items to one or more designated facilities maintained by or on behalf of the marketplace 210, such as the fulfillment center 230. Additionally, the vendor 220 may receive one or more items from other vendors, manufacturers or sellers (not shown), and may deliver one or more of such items to locations designated by the marketplace 210, such as the fulfillment center 230, for fulfillment and distribution to customers. Furthermore, the vendor 220 may perform multiple functions. For example, the vendor 220 may also be a manufacturer and/or a seller of one or more other items, and may offer items for purchase by customers at venues (not shown) other than the marketplace 210. Additionally, items that are made available at the marketplace 210 or ordered therefrom by customers may be made by or obtained from one or more third party sources, other than the vendor 220, or from any other source (not shown). Moreover, the marketplace 210 itself may be a vendor, a seller or a manufacturer.

The fulfillment center 230 may be any facility that is adapted to receive, store, process and/or distribute items. As is shown in FIG. 2, the fulfillment center 230 includes a networked computer infrastructure for performing various computer-related functions associated with the receipt, storage, processing and distribution of such items, including one or more physical computer servers 232, databases (or other data stores) 234 and processors 236. The fulfillment center 230 may also include stations for receiving, storing and distributing items to customers, such as one or more receiving stations, storage areas and distribution stations. The fulfillment center 230 further includes at least one RFID reader 240 having an antenna 242 and at least one imaging device 246.

The RFID reader 240 is any type of sensor or interrogator that may be provided for use in connection with signals transmitted from one or more active or passive RFID tags. The RFID reader 240 may include one or more components for transmitting or receiving signals, such as the antenna 242, as well as various circuitry components for processing and controlling the operation of the RFID reader 240. Additionally, the RFID reader 240 may communicate with RFID tags by way of any coupling modes or methods that may be known to those of ordinary skill in the pertinent arts. For example, an RFID tag may modulate one or more elements of the data stored thereon, and transmit a modulated data signal to a receiving circuit associated with the RFID reader 240. Subsequently, the RFID reader 240 may then demodulate the data signal, and provide a processed set of data derived from the data signal to the server 232 or another computer for further processing.

Moreover, the RFID reader 240 may be configured to capture, evaluate, transmit or store any available information regarding signals received from one or more RFID tags, including information regarding any attributes of the signals, including but not limited to sensed signal strengths or intensities, angular directions or ranges to the RFID tags from which such signals were received, any differences between the strengths, intensities, angular orientations or ranges associated with two or more signals, or information or data included in the signals. Although the fulfillment center 230 of FIG. 2 includes a single RFID reader 240, those of ordinary skill in the pertinent arts will recognize that any number of RFID readers 240 may be provided throughout a fulfillment center environment, and in any number of specified stations or locations, in accordance with the present disclosure.

The imaging device 246 may be any type or form of optical recording device that may be provided for the purpose of capturing one or more images or sets of imaging data regarding operations within the fulfillment center 230, including but not limited to digital images of one or more objects, humans, structures or machines therein. The imaging device 246 may include or comprise any form of optical recording device (e.g., a digital camera) that may be used to photograph or otherwise record images of objects, or perform any other function. The imaging device 246 may include an actuator, a shutter or a data store, and may be configured to capture one or more still or moving images, as well as any relevant audio signals or other information, and utilize such images, signals or other information for any purpose. For example, the imaging device 246 may be configured to identify, recognize and decode one or more marked identifiers on an object, e.g., a bar code, and to aggregate the decoded information with any other information. The imaging device 246 may also be configured to identify one or more humans by identifying, recognizing and decoding one or more marked identifiers, e.g., bar codes, provided on an identification badge or other apparatus, or according to one or more facial recognition techniques. The imaging device 246 may be mounted to any structure or frame, e.g., a tripod, and may even be worn about the human body, e.g., on an eyeglasses-type frame or like apparatus. Although the system 200 shown in FIG. 2 includes a single imaging device 246, those of ordinary skill in the pertinent arts will recognize that any number or type of imaging devices (e.g., cameras) may be provided in accordance with the present disclosure.

As is also shown in FIG. 2, the fulfillment center 230 also includes at least one worker 250, at least one item 254, at least one item carrier 260 and at least one storage facility 264. The worker 250 may be any designated personnel tasked with performing one or more tasks within the fulfillment center 230, and may wear, carry or otherwise be associated with or adorned with an RFID tag 252. The worker 250 may handle or transport items within the fulfillment center 230, operate one or more pieces of equipment therein (not shown). The worker 250 may also operate one or more specific computing devices or machines for registering the receipt, retrieval, transportation or storage of items within the fulfillment center 230, or a general purpose device such a personal digital assistant, a digital media player, a smartphone, a tablet computer, a desktop computer or a laptop computer (not shown), which may include any form of input and/or output peripherals such as scanners, readers, keyboards, keypads, touchscreens or like devices.

The item 254 may be any type or form of good, product, media or other tangible consumer article that may be received at, stored in or distributed from the fulfillment center 230. As is shown in FIG. 2, the item 254 has an RFID tag 256 mounted to, embedded therein or otherwise associated therewith. The item carrier 260 may be any form of vessel or facility for transporting an item from one location to another within the fulfillment center 230, such as a bin, a tote, a cart or another like device. As is also shown in FIG. 2, the item carrier 260 has an RFID tag 262 mounted to or otherwise associated therewith. The item carrier 260 may include any type or form of handles, hooks, bars or grips for carrying or pushing the item carrier 260 throughout the fulfillment center 230, and may be further provided with wheels, rails, sliders or other like components that enable the item carrier 260 to be transported throughout the fulfillment center 230 with ease. Alternatively, the item carrier 260 may be a motorized and/or self-guided robotic cart that may be programmed to automatically travel to and between various points within the fulfillment center 230.

The storage facility 264 may be any two-dimensional or three-dimensional space or structure for accommodating items and/or containers of such items within the fulfillment center 230, such as aisles, rows, bays, shelves, slots, bins, racks, tiers, bars, hooks, cubbies or other like storage means, or any other appropriate regions or stations. As is shown in FIG. 2, the storage facility 264 has an RFID tag 266 mounted to or otherwise associated therewith. The storage facility 264 may be fixed or mobile, e.g., associated with a wheeled component such as a self-powered or motorized cart.

The fulfillment center 230 may operate one or more order processing and/or communication systems using computer devices in communication with one or more of the server 232, the database 234 and/or the processor 236, or through one or more other computing devices or machines that may be connected to the network 280, as is indicated by line 238, in order to transmit or receive information in the form of digital or analog data, or for any other purpose. Such computer devices may also operate or provide access to one or more reporting systems for receiving or displaying information or data regarding workflow operations, and may provide one or more interfaces for receiving interactions (e.g., text, numeric entries or selections) from one or more operators, users or workers in response to such information or data. Such computer devices may be general purpose devices or machines, or dedicated devices or machines that feature any form of input and/or output peripherals such as scanners, readers, keyboards, keypads, touchscreens or like devices, and may further operate or provide access to one or more engines for analyzing the information or data regarding the workflow operations, or the interactions received from the one or more operators, users or workers.

Additionally, as is discussed above, the fulfillment center 230 may include one or more receiving stations featuring any apparatuses that may be required in order to receive shipments of items at the fulfillment center 230 from one or more sources and/or through one or more channels, including but not limited to docks, lifts, cranes, jacks, belts or other conveying apparatuses for obtaining items and/or shipments of items from carriers such as cars, trucks, trailers, freight cars, container ships or cargo aircraft (e.g., manned aircraft or unmanned aircraft, such as drones), and preparing such items for storage or distribution to customers. The fulfillment center 230 may also include one or more predefined two-dimensional or three-dimensional storage areas including facilities, such as the storage facility 264, for accommodating items and/or containers of such items, such as aisles, rows, bays, shelves, slots, bins, racks, tiers, bars, hooks, cubbies or other like storage means, or any other appropriate regions or stations. The fulfillment center 230 may further include one or more distribution stations where items that have been retrieved from a designated storage area may be evaluated, prepared and packed for delivery from the fulfillment center 230 to addresses, locations or destinations specified by customers, also by way of carriers such as cars, trucks, trailers, freight cars, container ships or cargo aircraft (e.g., manned aircraft or unmanned aircraft, such as drones).

Moreover, the fulfillment center 230 may further include one or more control systems that may generate instructions for conducting operations at the fulfillment center 230, and may be in communication with the RFID reader 240, the imaging device 246, the worker 250, the items 254, the item carriers 260, or the various storage facilities 264 at the fulfillment center 230. Such control systems may also be associated with one or more other computing devices or machines, and may communicate with the marketplace 210, the vendor 220 or the customer 270 over the network 280, as indicated by line 238, through the sending and receiving of digital data.

The customer 270 may be any entity or individual that wishes to download, purchase, rent, lease, borrow or otherwise obtain items (e.g., goods, products, services or information of any type or form) from the marketplace 210. The customer 270 may utilize one or more computing devices, such as a smartphone 272 or any other like machine that may operate or access one or more software applications, such as a web browser (not shown) or a shopping application 274, and may be connected to or otherwise communicate with the marketplace 210, the vendor 220 or the fulfillment center 230 through the network 280, as indicated by line 278, by the transmission and receipt of digital data. Moreover, the customer 270 may also receive deliveries or shipments of one or more items from facilities maintained by or on behalf of the marketplace 210, such as the fulfillment center 230, or from the vendor 220.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

Those of ordinary skill in the pertinent arts will understand that process steps described herein as being performed by a "marketplace," a "vendor," a "fulfillment center," a "worker," or a "customer," or like terms, may be automated steps performed by their respective computer systems, or implemented within software modules (or computer programs) executed by one or more general purpose computers. Moreover, process steps described as being performed by a "marketplace," a "vendor," a "fulfillment center," a "worker," or a "customer" may be typically performed by a human operator, but could, alternatively, be performed by an automated agent.

The marketplace 210, the vendor 220, the fulfillment center 230, the worker 250, and/or the customer 270 may use any web-enabled or Internet applications or features, or any other client-server applications or features including electronic mail (or E-mail), or other messaging techniques, to connect to the network 280 or to communicate with one another, such as through short or multimedia messaging service (SMS or MMS) text messages. For example, the server 232 may be adapted to transmit information or data in the form of synchronous or asynchronous messages from the fulfillment center 230 to the server 212, the laptop computer 222, a desktop computer, the smartphone 272 or any other computer device in real time or in near-real time, or in one or more offline processes, via the network 280. Those of ordinary skill in the pertinent art would recognize that the marketplace 210, the vendor 220, the fulfillment center 230, the worker 250 or the customer 270 may operate any of a number of computing devices that are capable of communicating over the network, including but not limited to set-top boxes, personal digital assistants, digital media players, web pads, laptop computers, desktop computers, electronic book readers, and the like. The protocols and components for providing communication between such devices are well known to those skilled in the art of computer communications and need not be described in more detail herein.

The data and/or computer executable instructions, programs, firmware, software and the like (also referred to herein as "computer executable" components) described herein may be stored on a computer-readable medium that is within or accessible by computers or computer components such as the server 212, the laptop computer 222, the server 232, or the smartphone 272, or any other computers or control systems utilized by the marketplace 210, the vendor 220, the fulfillment center 230, the worker 250 or the customer 270 and having sequences of instructions which, when executed by a processor (e.g., a central processing unit, or "CPU"), cause the processor to perform all or a portion of the functions, services and/or methods described herein. Such computer executable instructions, programs, software and the like may be loaded into the memory of one or more computers using a drive mechanism associated with the computer readable medium, such as a floppy drive, CD-ROM drive, DVD-ROM drive, network interface, or the like, or via external connections.

Some embodiments of the systems and methods of the present disclosure may also be provided as a computer executable program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, embodiments may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

Although some of the embodiments disclosed herein reference the use of RFID readers and RFID tags in a fulfillment center environment, and the use of RFID tags that are worn by workers, mounted to items or associated with equipment (e.g., item carriers or storage facilities) within the fulfillment center environment, the systems and methods are not so limited. Rather, the systems and methods disclosed herein may be utilized in any environment in which information regarding a physical transaction involving multiple discrete actors or entities must be captured, evaluated or stored, and are particularly useful in environments in which such information must be captured, evaluated or stored relatively quickly, and with a high degree of accuracy, including but not limited to environments in which traditional power supplies are not reliable or may not be readily accessed.

As is discussed above, the systems and methods of the present disclosure are directed to tracking transactions based on confluences or sequences of RFID signals, including a predetermined set of RFID signals that are received simultaneously or nearly simultaneously, e.g., at the same time, or within a predetermined time interval of one another, or a predetermined set of RFID signals or confluences of RFID signals that are received in a defined order or sequence, by an RFID reader from a defined set of RFID sources. When such confluences or sequences of signals are received, a transaction may be defined, and information regarding the transaction may be captured and stored in at least one data store, and subject to further processing.

Figure 3:
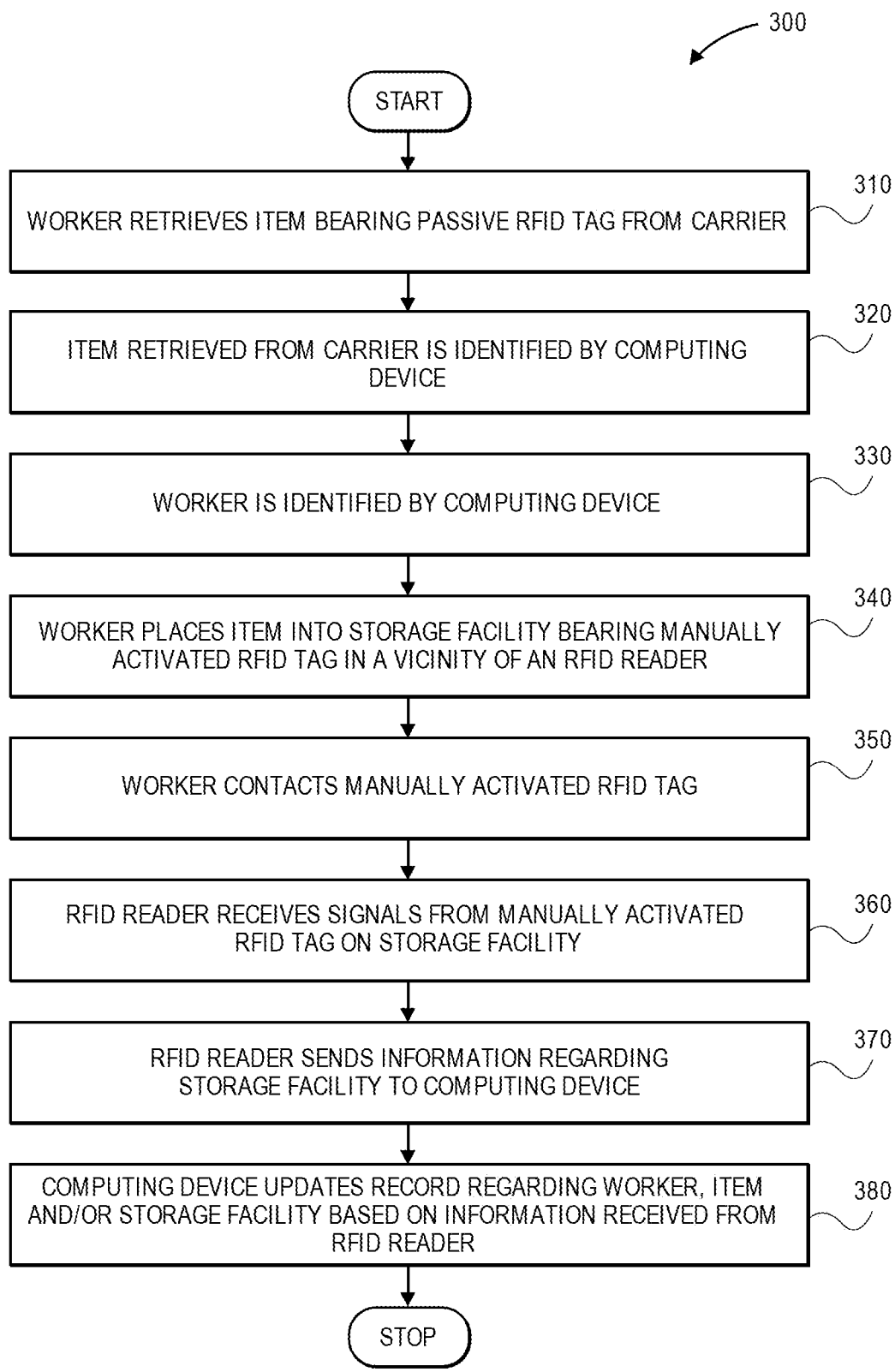
FIG. 3 is a flow chart of one process for tracking transactions by confluences and sequences of RFID signals, in accordance with embodiments of the present disclosure.

Referring to FIG. 3, a flow chart 300 representing one embodiment of a process for tracking transactions by confluences or sequences of RFID signals is shown. At box 310, a worker retrieves an item bearing a passive RFID tag from an item carrier. For example, referring to FIG. 1A, the worker 150 may retrieve the item 154 from a bin, a tote or a cart, and the item 154 may have an RFID tag mounted or otherwise adhered thereto, e.g., in the form of a label, or embedded in an external surface of the item 154 or a container having the item 154 therein. Alternatively, the worker 150 may have retrieved the item 154 from a storage facility, e.g., a bay, a shelf, a slot, a bin, a rack, a tier, a bar, a hook, a cubby or other like apparatus.

At box 320, the item retrieved from the carrier is identified by a computing device, and at box 330, the worker is identified by the computing device. For example, the item may be identified by scanning and reading or otherwise decoding one or more marked identifiers thereon, e.g., a bar code or a set of one or more alphanumeric characters, or by receiving an RFID signal from one or more RFID tags provided thereon, and identifying the item based at least in part on the RFID signal. Likewise, the worker may be identified based on a log-in name, number or password provided thereto, or an authentication based on the log-in name, number or password, as well as based on any type or form of identification system, including one or more facial recognition techniques, fingerprint recognition or authentication techniques.

At box 340, the worker places the item into a storage facility bearing a manually activated RFID tag in a vicinity of an RFID reader. For example, referring again to FIG. 1B, the worker 150 may deposit the item 154 into the storage facility 164, which is located in close proximity to the RFID reader 140. At box 350, the worker contacts the manually activated RFID tag on the storage facility, thereby causing an RFID signal to be transmitted by the manually activated RFID tag. For example, as is shown in FIG. 1C, the worker 150 may depress a portion of the manually activated RFID tag 166 affixed to the storage facility 164, thereby causing an internal circuit within the RFID tag 166 to be closed, and enabling an RFID signal containing a set of information or data stored thereon to be transmitted from the manually activated RFID tag 166 to the RFID reader 140.

At box 360, the RFID reader receives signals from the manually activated RFID tag provided on the storage facility. Referring again to FIG. 1C, upon contacting the manually activated RFID tag 166 disposed on the storage facility 164, an RFID signal is transmitted from the manually activated RFID tag 166 to the RFID reader 140 once an internal circuit within the RFID tag 166 is closed, e.g., by causing current to flow through one or more capacitive elements in response to bioelectricity from the worker, or through a mechanical switch closed by the worker.

At box 370, the RFID reader sends information regarding the storage facility to the computing device, and at box 380, the computing device updates a record regarding the worker, the item and/or the storage facility based on the information received from the RFID reader. For example, referring again to FIG. 1C, once the worker 150 contacts the manually activated RFID tag 166 on the storage facility 164, the storage facility 164 may be identified based on the RFID signal received from the manually activated RFID tag 166, and the item 154 may be identified based on imaging data captured from the item 154 by the imaging device 146. Subsequently, information 144 is transmitted from the RFID reader 140 and the imaging device 146 to the computing device 132, and the record 135 maintained in the data store 134 is updated based on the information 144.

Accordingly, the systems and methods of the present disclosure may be utilized to receive or update information regarding activity associated with the placement of one or more items in an item carrier, e.g., a bin, a tote or a cart, or storage facility, e.g., an aisle, a row, a bay, a shelf, a slot, a bin, a rack, a tier, a bar, a hook, a cubby or other like storage facility, based on a confluence of RFID signals received at one or more RFID readers. In particular, at least one of the RFID signals may be received from a manually activated RFID tag, which may be mounted to or otherwise associated with the item carrier or the storage facility.

Once a confluence of RFID signals is received at one or more RFID readers, information regarding the confluence of RFID signals, or regarding one or more of the objects, humans, machines or structures to which the RFID tags are applied, may be transmitted from the RFID reader to an external server or data store, and a record may be generated or updated accordingly based at least in part on the information. The confluence may be defined as having any number of mandatory RFID signals, and may be further defined to include any number of other relevant RFID signals that may also be detected in the presence of the mandatory RFID signals, as well.

Figure 4A:
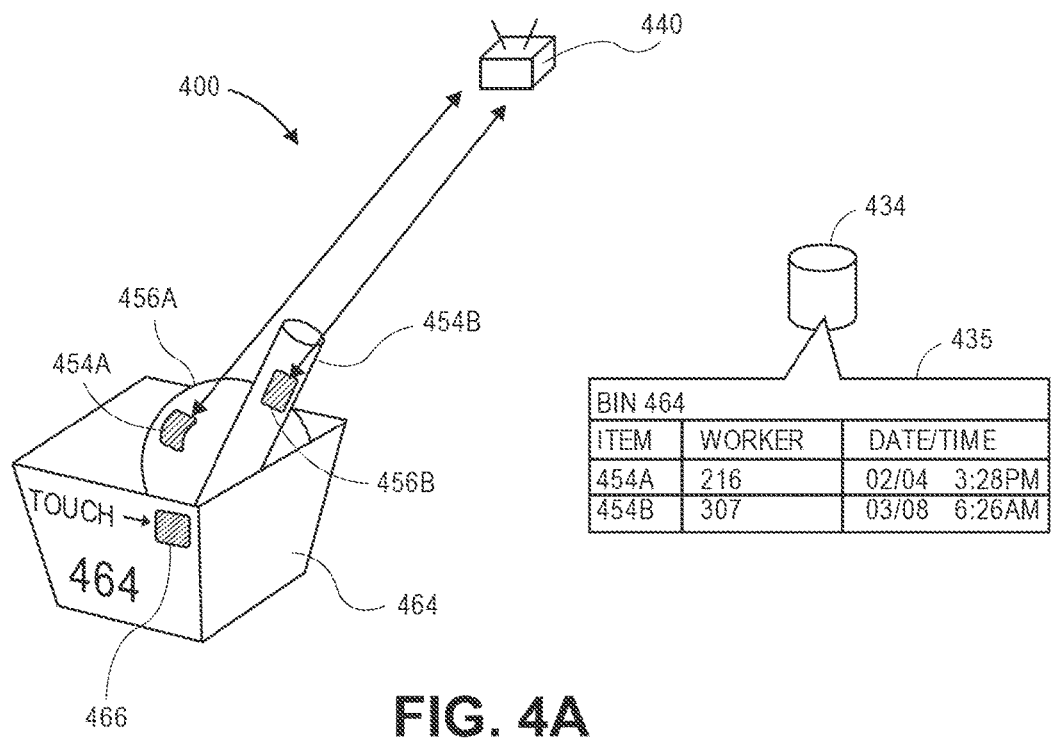
FIGS. 4A, 4B and 4C are views of one system for tracking transactions by confluences and sequences of RFID signals, in accordance with embodiments of the present disclosure.
Figure 4B:
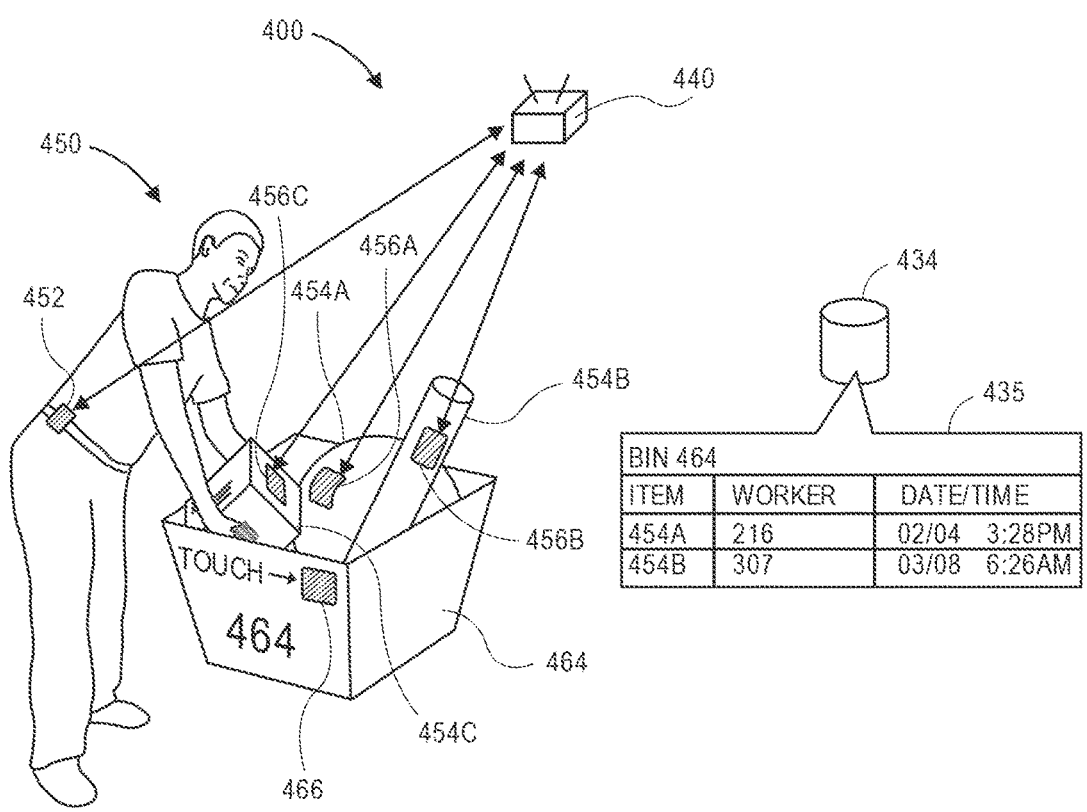
Figure 4C:
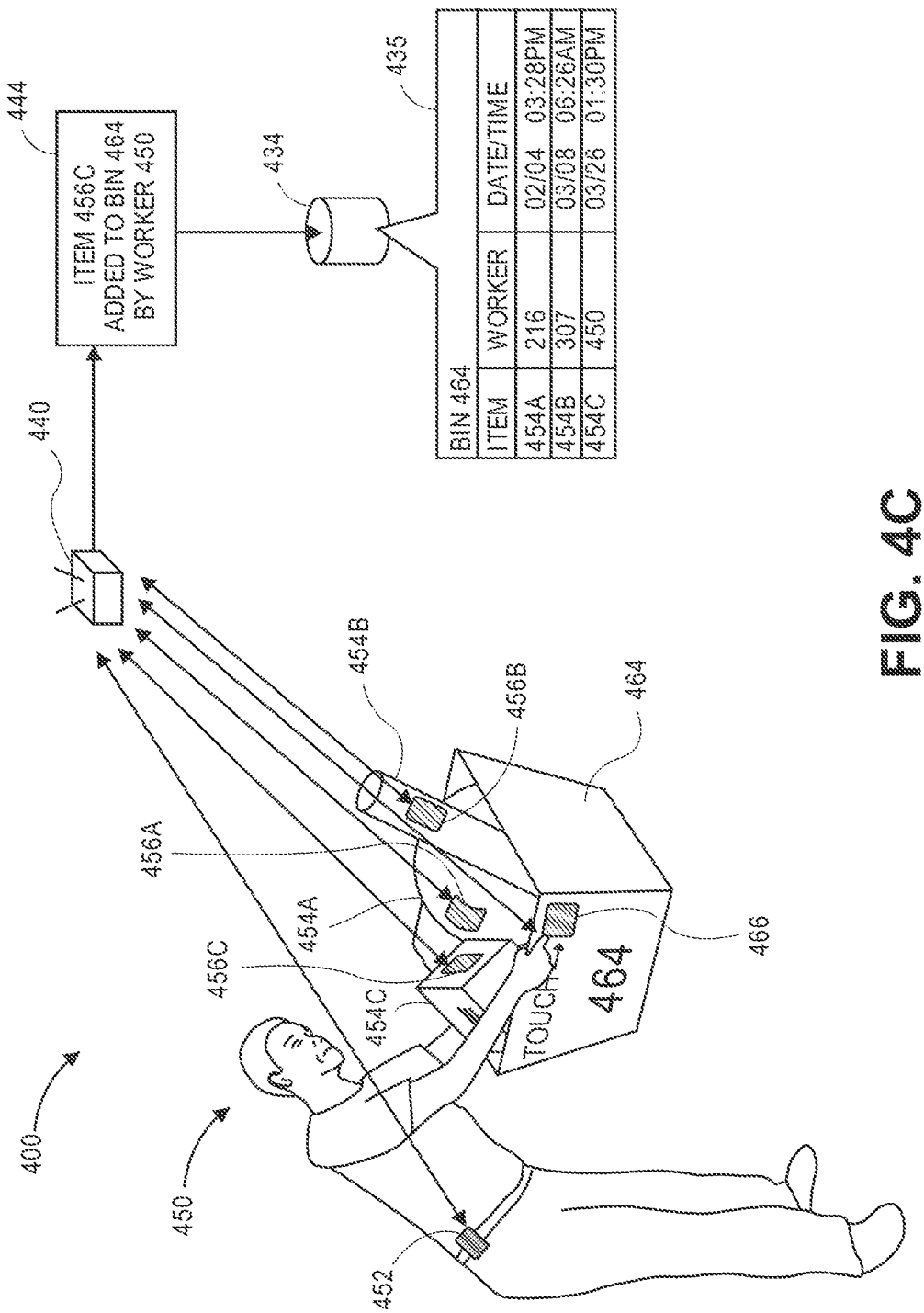

Referring to FIGS. 4A, 4B and 4C, a system 400 including a data store 434, an RFID reader 440 and a storage facility 464 (e.g., a bin) is shown. As is shown in FIG. 4A, the data store 434 includes a record 435 regarding the contents of the storage facility 464. The RFID reader 440 is mounted within a vicinity of the storage facility 464, and the storage facility 464 includes a plurality of items 454A, 454B therein. Each of the items 454A, 454B has an RFID tag 456A, 456B, respectively, mounted thereto, and a confluence of signals is received from the RFID tags 456A, 456B at the RFID reader 440.

As is shown in FIG. 4B, when a worker 450 deposits an item 454C bearing an RFID tag 456C into the storage facility 464, a confluence of signals may be received from the RFID tags 452, 456A, 456B, 456C at the RFID reader 440. However, the record 435 containing information regarding the contents of the storage facility 464 is not updated based on the confluence of signals received from the RFID tags 452, 456A, 456B, 456C alone.

Referring to FIG. 4C, when the worker 450 activates the manually activated RFID tag 466 mounted to the storage facility 464, e.g., by touching an external surface thereof, an RFID signal is transmitted from the manually activated RFID tag 466 to the RFID reader 440. Thus, at the time that the worker 450 touches the manually activated RFID tag 466, a confluence of signals is received from the RFID tags 452, 456A, 456B, 456C, 466. The RFID reader 440 then sends information 444 regarding the confluence of RFID signals to the data store 434, which updates the record 435 to indicate that the item 454C was added to the storage facility 464 on a particular date and time by the worker 450.

As is discussed above, a manually activated RFID tag may be formed of capacitive or conductive elements placed between one or more layers, including an external protective layer that may be contacted by a user in order to close a circuit within the manually activated RFID tag, and to enable the manually activated RFID tag to transmit an RFID signal to an RFID reader. The protective layers may be formed from any suitable material, e.g., flexible plastics or rubbers such as acrylics, vinyls, polyurethanes or the like, and may be adhered to or applied over one or more of the elements of the manually activated RFID tag. Moreover, an identifier or marking (e.g., alphanumeric characters, bar codes or the like) may be applied to an external surface of a manually activated RFID tag, or provided adjacent to or substantially near the manually activated RFID tag, thereby enabling a worker or other user to recognize the manually activated RFID tag as associated with a particular function or purpose prior to making contact with the manually activated RFID tag. Additionally, applying a bar code or other identifier to the external surface of the manually activated RFID tag may enable the manually activated RFID tag to be further utilized with existing systems that rely on scanning or reading such bar codes or identifiers in order to acknowledge a transaction involving a given object, human, machine or structure.

Figure 5A:
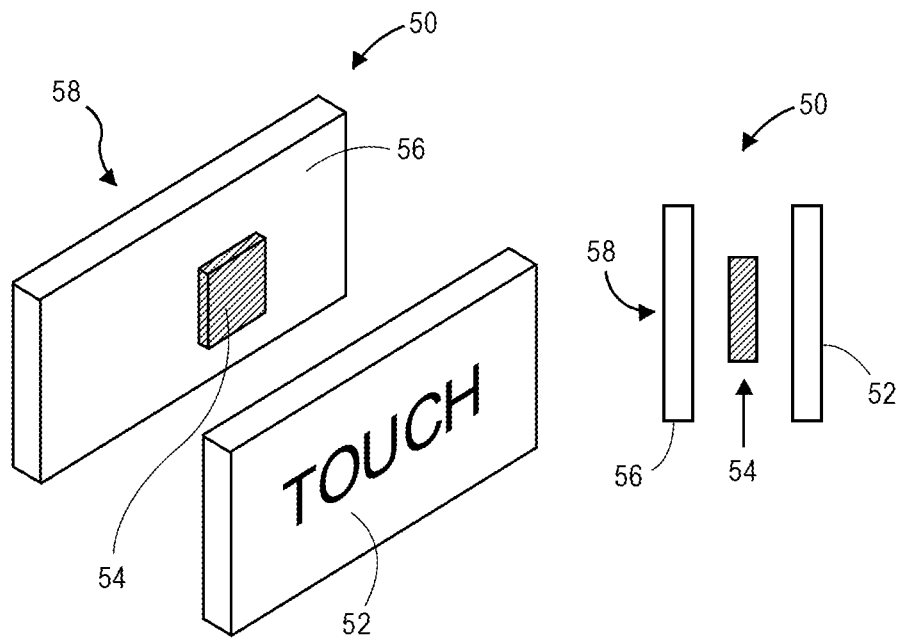
FIGS. 5A and 5B are views of one system for tracking transactions by confluences and sequences of RFID signals, in accordance with embodiments of the present disclosure.
Figure 5B:
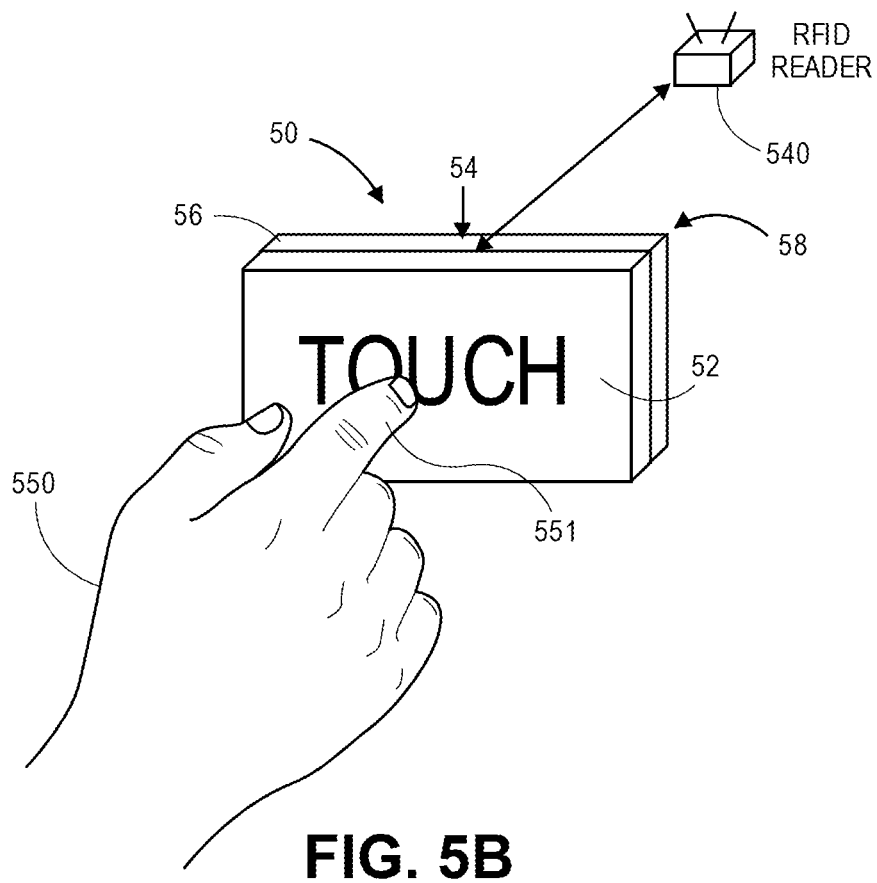

Referring to FIGS. 5A and 5B, an RFID device 50 is shown. Except where otherwise noted, reference numerals preceded by the number "5" shown in FIG. 5A or 5B indicate components or features that are similar to components or features having reference numerals preceded by the number "4" shown in FIGS. 4A-4C, by the number "2" shown in FIG. 2, or by the number "1" shown in FIGS. 1A-1C.

As is shown in FIG. 5A, the RFID device 50 includes a protective layer 52, a manually activated RFID tag 54 and a substrate 56 having an adhesive 58 applied to rear face of the substrate 56. Thus, the protective layer 52, the manually activated RFID tag 54 and the substrate 56 form a flexible stack that may be applied to any substantially flat surface using the adhesive 58. Additionally, as is also shown in FIG. 5A, the protective layer 52 further includes text on an outer surface thereof, which may be read or optically interpreted by a human or a machine (e.g., an autonomous mobile robot) configured to recognize such text, as well as any numbers, characters, markings or identifiers (e.g., a one-dimensional or two-dimensional bar code) that may be disposed thereon.

The RFID device 50 of FIG. 5A may be provided for use in any environment for which the capacity to transmit an RFID signal to an RFID reader upon request is desired. Referring to FIG. 5B, the RFID device 50 of FIG. 5A is shown in a vicinity of an RFID reader 540. As is shown in FIG. 5B, upon a contact by a finger 551 of a user 550, the RFID device 50 may transmit an RFID signal to the RFID reader 540. Those of ordinary skill in the pertinent art will recognize that the RFID signal may include any type or form of information or data that may be transmitted and received by an RFID system, and may be transmitted at any frequency or over any range. Upon receiving the RFID signal, the RFID reader 540 may transmit information regarding the RFID device 50 or the RFID signal to an external server or computer device (not shown), which may take any relevant action in response to the information.

Figure 6A:
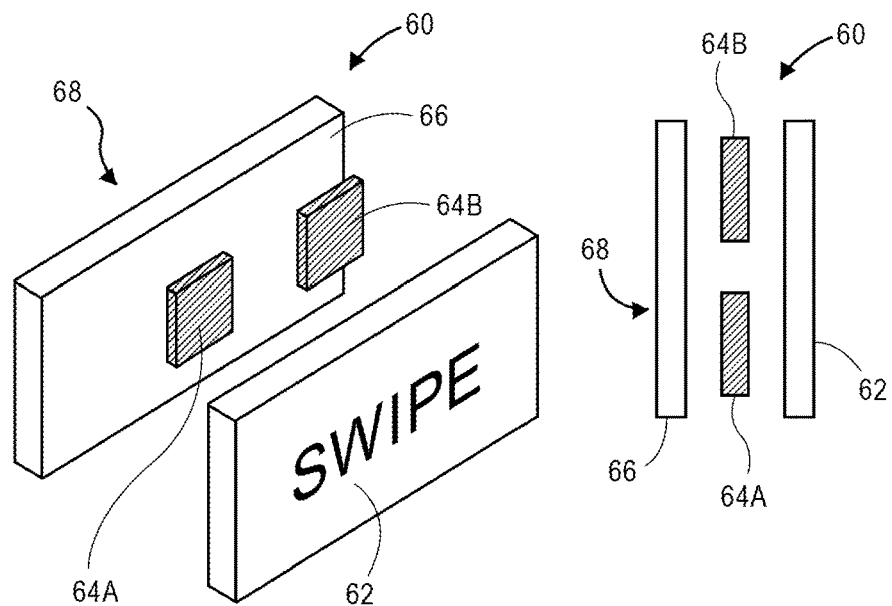
FIGS. 6A and 6B are views of one system for tracking transactions by confluences and sequences of RFID signals, in accordance with embodiments of the present disclosure.
Figure 6B:
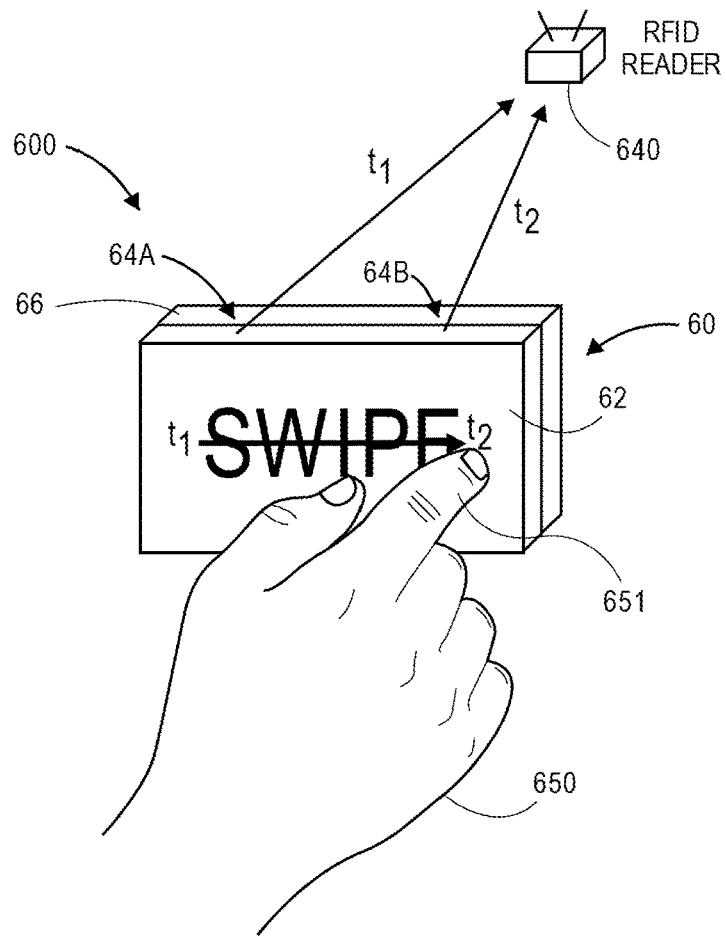

As is also discussed above, an RFID device may include two or more manually activated RFID tags aligned in close proximity to one another, such that a single manual action, e.g., a swipe of a finger, may activate each of the RFID tags, and cause a sequence of RFID signals to be transmitted to an RFID reader. Referring to FIGS. 6A and 6B, an RFID device 60 is shown. Except where otherwise noted, reference numerals preceded by the number "6" in FIG. 6A or 6B indicate components or features that are similar to components or features having reference numerals preceded by the number "5" shown in FIG. 5A or 5B, by the number "4" shown in FIGS. 4A-4C, by the number "2" shown in FIG. 2, or by the number "1" shown in FIGS. 1A-1C.

As is shown in FIG. 6A, the RFID device 60 includes a protective layer 62, a pair of manually activated RFID tags 64A, 64B and a substrate 66 having an adhesive 68 applied to rear face of the substrate 66. The manually activated RFID tags 64A, 64B are located within a close proximity of one another, but include discrete RFID circuits for transmitting independent RFID signals to an RFID reader, and are embedded between the protective layer 62 and the substrate 66. The protective layer 62, the manually activated RFID tags 64A, 64B and the substrate 66 form a flexible stack that may be applied to any substantially flat surface using the adhesive 68. Additionally, as is also shown in FIG. 6A, the protective layer 62 also includes text on an outer surface thereof.

The RFID device 60 of FIG. 6A may be provided for use in any environment for which the capacity to transmit an RFID signal to an RFID reader upon request is desired. Referring to FIG. 6B, the RFID device 60 of FIG. 6A is shown in a vicinity of an RFID reader 640. As is shown in FIG. 6B, a user 650 may swipe a finger 651 across the RFID device 60 in a single motion, thereby contacting the RFID tag 64A at time $t_1$ and the RFID tag 64B at time $t_2$, and causing a sequence of RFID signals including any type or form of information or data, and at any frequency or over any range, to be transmitted to the RFID reader 640 at time $t_1$ and at time $t_2$. Upon receiving the sequence of RFID signals from the RFID tags 64A, 64B, the RFID reader 640 may transmit information regarding the RFID device 60 or the sequence of RFID signals to an external server or computer device (not shown), which may take any relevant action in response to the information.

Those of ordinary skill in the pertinent art may recognize that the RFID device 60 of FIGS. 6A and 6B may enhance the reliability and relevance of information provided thereby. For example, because the RFID reader 640 may be configured to recognize and respond only to a sequence of RFID signals received from the RFID tags 64A, 64B received within a finite interval of time, and not a single RFID signal received from either RFID tag 64A or RFID tag 64B, the information transmitting systems are inherently more reliable in that only a deliberate action causing the sequence of RFID signals may trigger a response by the RFID reader 640. Therefore, inadvertent contact with either the RFID tag 64A or the RFID tag 64B will not cause any relevant action to be taken by the RFID reader 640.

As is further discussed above, manually activated RFID tags may be provided in any orientation, configuration or layout, and each of the manually activated RFID tags may be marked with one or more identifiers corresponding to the information or data to be transmitted to an RFID reader in response to contact with a respective RFID tag. For example, a plurality of manually activated RFID tags may be provided in a layout corresponding to a keyboard or keypad, such that information may be selectively entered by a worker or other user in a sequence of RFID signals that are transmitted to an RFID reader in response to contact with the respective RFID tags.

Figure 7A:
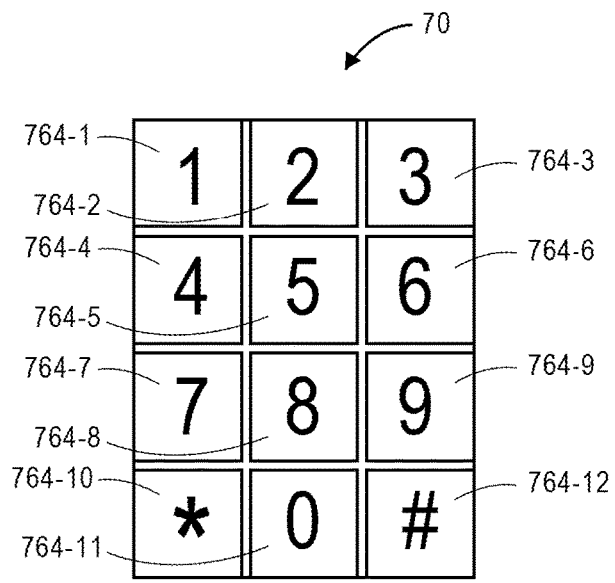
FIGS. 7A and 7B are views of components of one system for tracking transactions by confluences and sequences of RFID signals, in accordance with embodiments of the present disclosure.
Figure 7B:
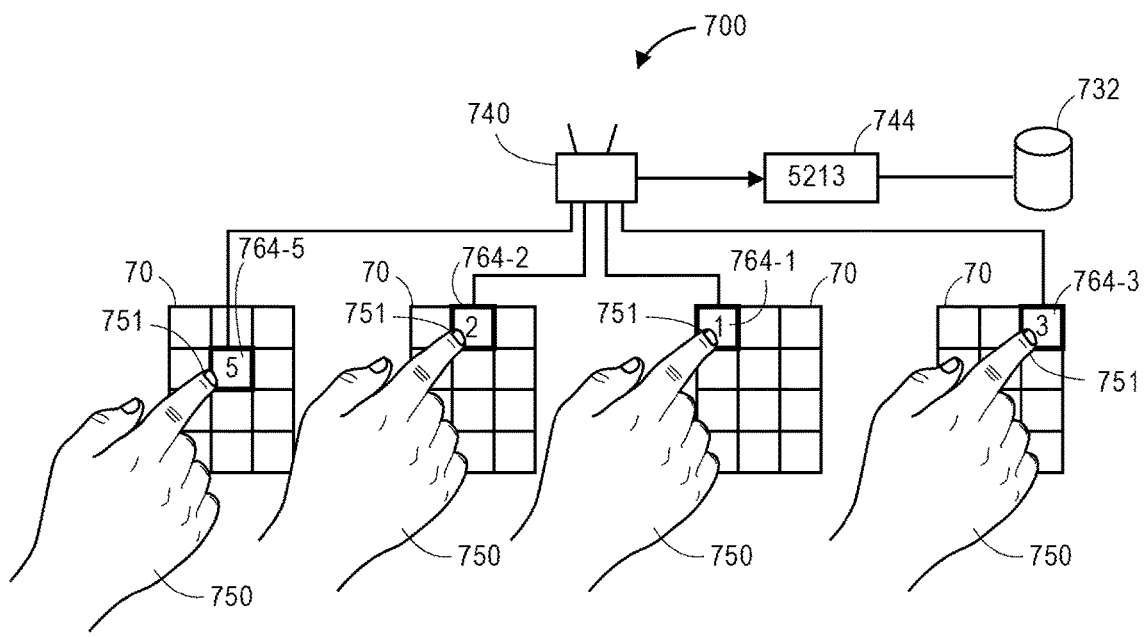

Referring to FIGS. 7A and 7B, an RFID keypad device 70 is shown. Except where otherwise noted, reference numerals preceded by the number "7" in FIG. 7A or 7B indicate components or features that are similar to components or features having reference numerals preceded by the number "6" shown in FIG. 6A or 6B, by the number "5" shown in FIG. 5A or 5B, by the number "4" shown in FIGS. 4A-4C, by the number "2" shown in FIG. 2, or by the number "1" shown in FIGS. 1A-1C.

Referring to FIG. 7A, the RFID keypad device 70 includes a plurality of manually activated RFID tags 764-1, 764-2, 764-3, 764-4, 764-5, 764-6, 764-7, 764-8, 764-9, 764-10, 764-11, 764-12 provided in an array. Each of the RFID tags 764-1, 764-2, 764-3, 764-4, 764-5, 764-6, 764-7, 764-8, 764-9, 764-10, 764-11, 764-12 in the RFID keypad device 70 is marked with a number or character, and is configured to transmit information corresponding to the marked number or character upon contact by a user.

Referring to FIG. 7B, a system 700 including the RFID keypad device 70 of FIG. 7A, a data store 732 and an RFID reader 740 is shown. As is shown in FIG. 7B, a worker 750 may contact the various RFID tags 764-1, 764-2, 764-3, 764-4, 764-5, 764-6, 764-7, 764-8, 764-9, 764-10, 764-11, 764-12 with a finger 751 and cause corresponding RFID signals to be transmitted to the RFID reader 740. For example, as is shown in FIG. 7B, the worker 750 may contact the RFID tag 764-5 at time $t_1$, the RFID tag 764-2 at time $t_2$, the RFID tag 764-1 at time $t_3$ and the RFID tag 764-3 at time $t_4$, thereby causing a sequence of RFID signals to be transmitted to the RFID reader 740. Upon receiving the sequence of RFID signals, the RFID reader 740 may transmit information or data based on the sequence of signals, viz., the numeric code 5213, to the data store 732, where such information may be evaluated on any basis, or utilized for any purpose.

Moreover, a sequence of RFID signals received in response to contact with one or more manually activated RFID tags may be further associated with any other RFID signals that are simultaneously or nearly simultaneously received at an RFID reader from any other RFID tags of any type (e.g., passive RFID tags) that may be located nearby. For example, where a worker bearing a RFID tag (e.g., a passive RFID tag applied to an identification badge or key assigned to the worker) contacts a plurality of manually activated RFID tags, thereby causing RFID signals to be transmitted from such tags to an RFID reader, a sequence of RFID signals may be defined by the confluences of the RFID signal from the RFID tag borne by the worker and the RFID signals from the individual manually activated RFID tags that are simultaneously or nearly simultaneously received at the RFID reader upon contact with such tags by the worker. In this regard, the contact with the manually activated RFID tags, and the sequence of RFID signals transmitted by such RFID tags, may be directly associated with actions (e.g., contact with such RFID tags) of the worker.

Figure 8:
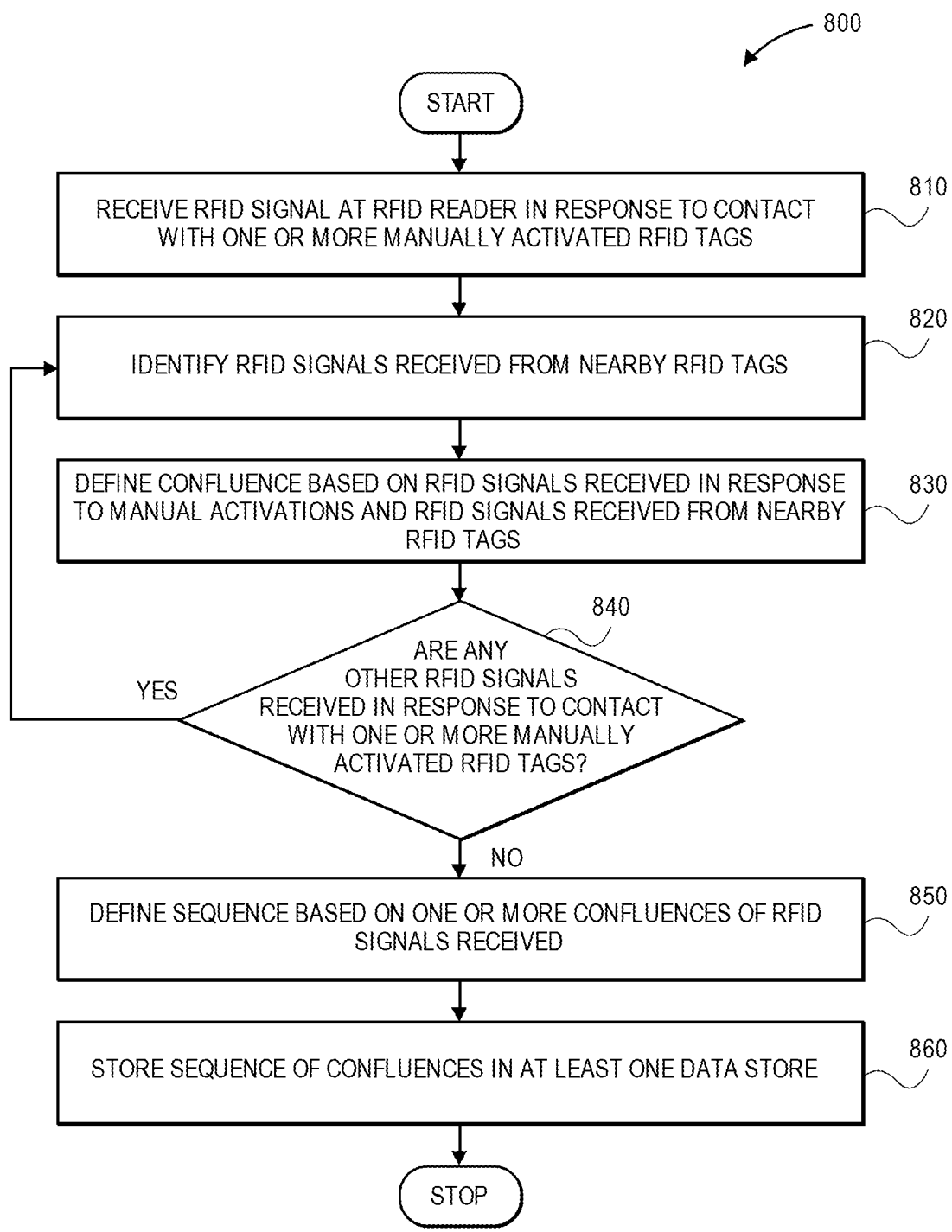
FIG. 8 is a flow chart of one process for tracking transactions by confluences and sequences of RFID signals, in accordance with embodiments of the present disclosure.

Referring to FIG. 8, a flow chart 800 representing one embodiment of a process for tracking transactions by confluences or sequences of RFID signals is shown. At box 810, an RFID signal at an RFID reader is received in response to contact with one or more manually activated RFID tags, e.g., by a worker or other user. For example, the worker 550 of FIG. 5B may contact the RFID device 50, or the worker 650 of FIG. 6B may swipe the RFID device 60, thereby causing one or more RFID signals to transmitted by such RFID devices 50, 60 and received at an RFID reader 540, 640.

At box 820, any RFID signals that are received from any nearby RFID tags are identified. As is discussed above, RFID tags, e.g., a passive RFID tag, are configured to transmit an RFID signal when within range of an RFID reader. Therefore, any RFID signals that are contemporaneously received from RFID tags by the RFID reader at the same time as the RFID signals that are received in response to contact with the manually activated RFID tag may be identified. At box 830, a confluence is defined based on the RFID signals that were received in response to the manual activations of the manually activated RFID tags at box 810 and the RFID signals that were concurrently being received from nearby RFID tags at box 820.

At box 840, whether any other RFID signals are received in response to contact with one or more manually activated RFID tags is determined. For example, referring to the RFID device 60 of FIGS. 6A and 6B, whether an RFID signal is received from the RFID tag 64B after an RFID signal was received from the RFID tag 64A may be determined. Likewise, referring to the RFID device 70 of FIGS. 7A and 7B, whether any RFID signals are subsequently received following contact with one or more of the other numbered RFID tags 764-1, 764-2, 764-3, 764-4, 764-5, 764-6, 764-7, 764-8, 764-9, 764-10, 764-11, 764-12 may be determined.

If any RFID signals are subsequently received in response to contact with one or more manually activated RFID tags, then the process returns to box 820, where RFID signals received from nearby passive RFID tags are identified, and to box 830, where a confluence is defined based on the RFID signals received in response to contact with one or more manually activated RFID tags, and the RFID signals received from nearby passive RFID tags. If no other RFID signals are subsequently received in response to contact with one or more manually activated RFID tags, then the process advances to box 850, where a sequence is defined based on the one or more confluences defined at box 830. For example, referring again to FIG. 7B, a sequence of four confluences of an RFID signal received from a passive RFID tag associated with the worker 750 and the respective RFID signals received from contact with the manually activated RFID tags 764-5, 764-2, 764-1, 764-3 by the worker 750 may be defined. At box 860, the sequence of confluences is stored in at least one data store, where the sequence of confluences or any associated information or data may be evaluated or utilized for any purpose, and the process ends.

Thus, the systems and methods of the present disclosure may associate a sequence of RFID signals received by an RFID reader in response to contact with one or more manually activated RFID tags by a worker, or a sequence of RFID signals or confluences defined by such RFID signals and any other RFID signals that may be concurrently received by the RFID reader, with the performance of a given task by the worker. In this regard, the systems and methods of the present disclosure may rapidly and effectively capture and transfer information regarding the performance of the task by the worker from an RFID reader to an external server or other computing device.

Figure 9:
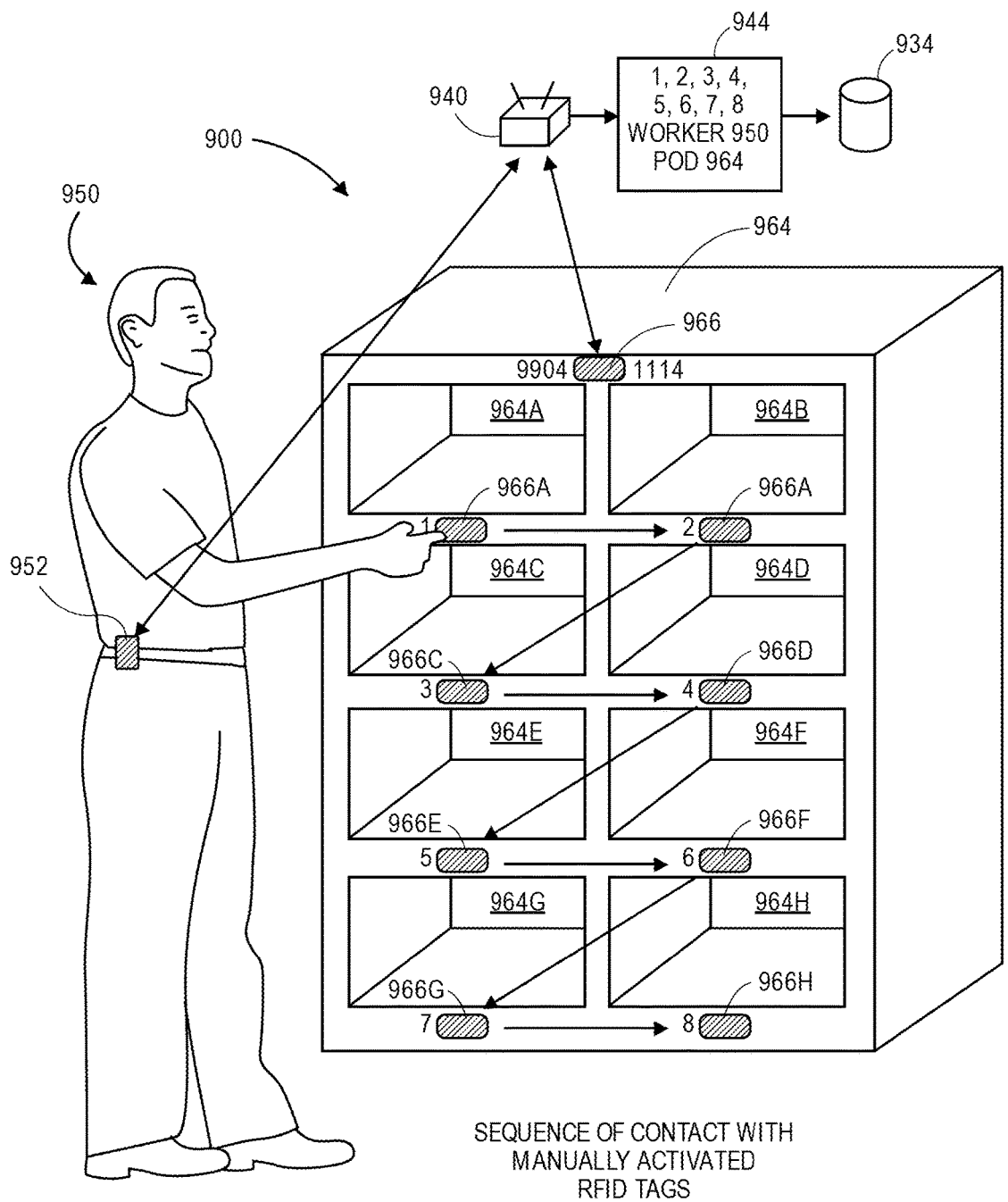
FIG. 9 is a view of one system for tracking transactions by confluences and sequences of RFID signals, in accordance with embodiments of the present disclosure.

One example of confirming the performance of a task using sequences of RFID signals or confluences of RFID signals received at an RFID reader is shown in FIG. 9. Referring to FIG. 9, a system 900 is shown. Except where otherwise noted, reference numerals preceded by the number "9" in FIG. 9 indicate components or features that are similar to components or features having reference numerals preceded by the number "7" shown in FIG. 7A or 7B, by the number "6" shown in FIG. 6A or 6B, by the number "5" shown in FIG. 5A or 5B, by the number "4" shown in FIGS. 4A-4C, by the number "2" shown in FIG. 2, or by the number "1" shown in FIGS. 1A-1C.

As is shown in FIG. 9, the system 900 includes a data store 934, an RFID reader 940, a worker 950 and a storage facility 964. The data store 934 may be associated with any type of networked computer infrastructure, and may be configured to receive information from the RFID reader 940 or any other sources (not shown). The worker 950 is wearing a passive RFID tag or device 952 about his or her waist, and is within range of the RFID reader 940. The storage facility 964 may be any fixed or mobile storage apparatus, such as a set of shelves provided on a floor or mounted to a wall of a fulfillment center or other like facility, or a set of bins provided on an autonomous mobile robot or other like machine. As is shown in FIG. 9, the storage facility 964 includes a plurality of bins 964A, 964B, 964C, 964D, 964E, 964F, 964G, 964H, each of which featuring a manually activated RFID device 966A, 966B, 966C, 966D, 966E, 966F, 966G, 966H associated therewith. The manually activated RFID devices 966A, 966B, 966C, 966D, 966E, 966F, 966G, 966H may take any form and include any number of RFID tags, including a single RFID tag, e.g., the single RFID tag 54 included in the RFID device 50 of FIGS. 5A and 5B, or multiple RFID tags, e.g., the multiple RFID tags 64A, 64B of the RFID device 60 of FIGS. 6A and 6B, or the multiple RFID tags RFID tags 764-1, 764-2, 764-3, 764-4, 764-5, 764-6, 764-7, 764-8, 764-9, 764-10, 764-11, 764-12 of the RFID device 70 of FIGS. 7A and 7B, which may be activated upon a single manual action or multiple manual actions by a user.

Frequently, when a storage facility is initially configured in a fulfillment center or another like facility, the various bins or other storage areas included within the storage facility must be registered and functionally linked with the storage facility using one or more computers associated with the fulfillment center, in order to ensure that a virtual record of the physical configuration of the fulfillment center may be created and stored. Currently, one method for registering the various bins or other aspects (e.g., bays, shelves, slots, racks, tiers, bars, hooks, cubbies or other like components) of the storage facility within a fulfillment center includes affixing bar codes or other marked identifiers to one or more of the aspects of the storage facility, decoding the bar codes or identifiers using a bar code scanner or reader, associating the decoded information obtained from the bar codes or identifiers to the aspects of the storage facility to which such bar codes or identifiers are affixed, and storing a record of the associations between the decoded information and the aspects of the storage facility in at least one data store. However, the registration of each of the aspects of the storage facility may be a time-consuming process that requires extensive manual interaction with each of the various aspects that are to be registered. Such a process must be repeated for each of the storage facilities in the fulfillment center, as well.

In accordance with the present disclosure, the registration of the various bins or other aspects of a storage facility may be accomplished using manually activated RFID tags. For example, as is shown in FIG. 9, the worker 950 may manually contact each of the various tags 966A, 966B, 966C, 966D, 966E, 966F, 966G, 966H associated with the bins 964A, 964B, 964C, 964D, 964E, 964F, 964G, 964H, in series, thereby causing RFID signals to be transmitted from the various tags 966A, 966B, 966C, 966D, 966E, 966F, 966G, 966H to the RFID reader 940. Because the RFID reader 940 also receives RFID signals from the passive RFID tag 952 associated with the worker 950, and from the passive RFID tag 966 generally associated with the storage facility 964, a sequence of confluences including an RFID signal from the RFID tag 952, an RFID signal from the RFID tag 966, and each of the RFID tags 966A, 966B, 966C, 966D, 966E, 966F, 966G, 966H may be received by the RFID reader 940. Therefore, the confluences may be associated with the registration of each of the respective bins 964A, 964B, 964C, 964D, 964E, 964F, 964G, 964H, and information 944 regarding such confluences may be transmitted from the RFID reader 940 to the data store 934, where such information may be stored in one or more records.

Subsequently, the manually activated RFID tags 966A, 966B, 966C, 966D, 966E, 966F, 966G, 966H may be utilized when registering activity regarding one or more of the bins 964A, 964B, 964C, 964D, 964E, 964F, 964G, 964H, including adding an item to or removing an item from the bins 964A, 964B, 964C, 964D, 964E, 964F, 964G, 964H, such as is shown in FIGS. 1A-1C or FIGS. 4A-4C, or for any other relevant purpose.

Although the disclosure has been described herein using exemplary techniques, components, and/or processes for implementing the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure. For example, although some of the embodiments of the present disclosure are shown as being utilized in a fulfillment center environment, e.g., with RFID tags provided on workers at a fulfillment center, or on objects, machines or structures within the fulfillment center, the systems and methods disclosed herein are not so limited, and may be provided in connection with objects, humans, machines or structures in any environment, including but not limited to autonomous mobile robots.

It should be understood that, unless otherwise explicitly or implicitly indicated herein, any of the features, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Moreover, with respect to the one or more methods or processes of the present disclosure described herein, including but not limited to the flow charts shown in FIGS. 3 and 8, the order in which the boxes or steps of the methods or processes are listed is not intended to be construed as a limitation on the claimed inventions, and any number of the boxes or steps can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain embodiments could include, or have the potential to include, but do not mandate or require, certain features, elements and/or boxes or steps. In a similar manner, terms such as "include," "including" and "includes are generally intended to mean "including, but not limited to." Thus, such conditional language is not generally intended to imply that features, elements and/or boxes or steps are in any way required for one or more embodiments or that one or more embodiments necessarily include logic for deciding, with or without user input or prompting, whether these features, elements and/or boxes or steps are included or are to be performed in any particular embodiment.

Although the invention has been described and illustrated with respect to exemplary embodiments thereof, the foregoing and various other additions and omissions may be made therein and thereto without departing from the spirit and scope of the present disclosure.

What is claimed is:

1. An information recording system comprising:
    an RFID reader;
    a first RFID device physically attached to at least one aspect of a storage facility, wherein the storage facility is configured to receive a first object, and wherein the first RFID device comprises a substrate, a protective layer, a first manually activated RFID tag disposed between the substrate and the protective layer, wherein the first manually activated RFID tag comprises a first circuit configured to be closed by bioelectricity, and a second manually activated RFID tag disposed between the substrate and the protective layer, wherein the second manually activated RFID tag comprises a second circuit configured to be closed by bioelectricity; and
    a computing device in communication with the RFID reader,
    wherein the computing device is configured to at least:
        identify the first object;
        receive, at the RFID reader, a first RFID signal from the first RFID device at a first time, wherein the first RFID signal is transmitted by the first RFID device upon contact with at least a first portion of the first RFID device by a user, wherein the first portion of the first RFID device is a first portion of the protective layer;
        define a transaction based at least in part on information regarding the first RFID signal and at least one of the first object, the storage facility, the RFID reader or the first time; and
        store at least some of the information in at least one data store.

2. The information recording system of claim 1, further comprising an imaging device including at least the at least one aspect of the storage facility within a field of view of the imaging device,
    wherein the computing device is in communication with the imaging device, and
    wherein the computing device is further configured to at least:
        capture at least one image of at least a portion of the first object,
    wherein the first object is identified based at least in part on the at least one image.

3. The information recording system of claim 2, wherein the computing device is further configured to at least:
    decode the first RFID signal,
    wherein the at least some of the information stored in the at least one data store comprises the at least one image and the decoded first RFID signal.

4. The information recording system of claim 2, further comprising a second RFID device associated with the user,
    wherein the computer device is further configured to at least:
        receive, at the RFID reader, a second RFID signal from the second RFID device at the first time, wherein the transaction is defined based at least in part on information regarding at least one of the user, the second RFID device or the second RFID signal.

5. The information recording system of claim 1,
wherein the computing device is further configured to at least:
receive, at the RFID reader, a second RFID signal from the first RFID device at a second time, wherein the second RFID signal is transmitted by the first RFID device upon contact with at least a second portion of the protective layer by the user,
wherein the first RFID signal is transmitted by the first manually activated RFID tag and the second RFID signal is transmitted by the first RFID device in response to a swipe of at least the first portion of the first RFID device and the second portion of the first RFID device,
wherein the second time is within a predetermined time interval of the first time, and
wherein the transaction is defined based at least in part by information regarding the second RFID signal.

6. A method comprising:
identifying a first object;
receiving, by at least one RFID reader, a first RFID signal transmitted by a first RFID device physically attached to a storage facility, wherein the storage facility is configured to receive the first object, and wherein the first RFID device comprises a substrate, a protective layer, and a plurality of manually activated RFID tags disposed between the substrate and the protective layer, and wherein the first RFID signal is transmitted by the first RFID device in response to first manual contact with at least a first portion of the first RFID device; and
in response to receiving the first RFID signal,
storing information regarding an association between the first object and the storage facility in at least one data store.

7. The method of claim 6, wherein identifying the first object comprises:
receiving, by the at least one RFID reader, a second RFID signal transmitted by a second RFID device associated with the first object,
wherein the first RFID signal is received at a first time,
wherein the second RFID signal is received at substantially the first time, and
wherein the information regarding the association between the first object and the storage facility is stored in the at least one data store in response to receiving the second RFID signal.

8. The method of claim 7, further comprising:
identifying at least one human associated with the first object,
wherein the first manual contact with the first portion of the first RFID device is made by the human, and
wherein the information regarding the association between the first object and the storage facility comprises an identity of the human.

9. The method of claim 8, wherein identifying the at least one human associated with the first object comprises:
receiving, by the at least one RFID reader, a third RFID signal transmitted by a third RFID device associated with the human,
wherein the third RFID signal is received at substantially the first time.

10. The method of claim 6, further comprising:
capturing, by at least one imaging device, an image of at least a portion of the first object,
wherein the first object is identified based at least in part on the image of at least the portion of the first object.

11. The method of claim 6, wherein the first RFID device further comprises:
a first manually activated RFID tag of the plurality of manually activated RFID tags disposed between the substrate and the protective layer, wherein the first manually activated RFID tag comprises a first circuit configured to be closed by bioelectricity; and
a second manually activated RFID tag of the plurality of manually activated RFID tags disposed between the substrate and the protective layer, wherein the second manually activated RFID tag comprises a second circuit configured to be closed by bioelectricity,
wherein the method further comprises:
receiving, by the at least one RFID reader, a second RFID signal transmitted by the first RFID device,
wherein the first RFID signal is transmitted by the first manually activated RFID tag in response to the first manual contact,
wherein the second RFID signal is transmitted by the second manually activated RFID tag in response to the first manual contact,
wherein the first manual contact is a swipe of at least the first portion of the protective layer corresponding to the first manually activated RFID tag at a first time and a second portion of the protective layer corresponding to the second manually activated RFID tag at a second time,
wherein the second time is within a predetermined interval of the first time.

12. The method of claim 6, further comprising:
receiving, by the at least one RFID reader, a second RFID signal transmitted by the first RFID device physically attached to the storage facility, wherein the second RFID signal is transmitted by the first RFID device in response to second manual contact with at least a second portion of the first RFID device;
identifying a sequence of RFID signals associated with at least one of the first object or the storage facility;
determining whether the first RFID signal and the second RFID signal are consistent with the sequence;
in response to determining that the first RFID signal and the second RFID signal are consistent with the sequence,
generating the information regarding the association between the first object and the storage facility based at least in part on the sequence.

13. The method of claim 6, wherein storing the information regarding the association between the first object and the storage facility comprises:
generating or updating a record of contents of the storage facility in the at least one data store to indicate at least that the first object is in the storage facility.

14. The method of claim 13, further comprising:
receiving, by the at least one RFID reader, a second RFID signal transmitted by a second RFID device associated with a second object; and
generating or updating the record of the contents of the storage facility in the at least one data store to indicate at least that the second object is in the storage facility.

15. The method of claim 6,
wherein each of the plurality of manually activated RFID tags is configured to transmit a unique RFID signal in response to manual contact with a portion of the first RFID device corresponding to one of the manually activated RFID tags, and wherein receiving, by the at least one RFID reader, the first RFID signal transmitted by the first RFID device comprises:
receiving, by the at least one RFID reader, a plurality of unique RFID signals transmitted by the first RFID device, wherein the first RFID signal is one of the plurality of unique RFID signals; and
defining a sequence based at least in part on the plurality of unique RFID signals received by the at least one RFID reader,
wherein the information regarding the association between the first object and the storage facility is stored in the at least one data store in response to the sequence.

16. The method of claim 15, wherein each of the unique RFID signals is associated with at least one alphanumeric character, at least one symbol or a string comprising the at least one alphanumeric character or the at least one symbol.

17. A method comprising:
providing a first RFID device comprising a plurality of manually activated RFID tags, wherein each of the manually activated RFID tags is configured to transmit an RFID signal upon manual contact with a portion of the first RFID device, wherein the first RFID device comprises a substrate, a protective layer, and the plurality of manually activated RFID tags disposed between the substrate and the protective layer;
receiving, at an RFID reader, a plurality of RFID signals from at least one of the manually activated RFID tags of the first RFID device, wherein each of the plurality of RFID signals is received within a predetermined interval of time;
defining a sequence based at least in part on the plurality of RFID signals received from the at least one of the manually activated RFID tags of the first RFID device;
identifying a transaction associated with the sequence; and
storing information regarding the transaction associated with the sequence in at least one data store.

18. The method of claim 17, further comprising:
receiving, at the RFID reader, an RFID signal from a second RFID device associated with a human; and
determining an identification of the human based at least in part on the RFID signal received from the second RFID device,
wherein the sequence is defined based at least in part on the RFID signal received from the second RFID device, and wherein the information regarding the transaction associated with the sequence comprises the identification of the human.

19. The method of claim 17, wherein the first RFID device further comprises:
a first manually activated RFID tag of the plurality of manually activated RFID tags disposed between the substrate and the protective layer, wherein the first manually activated RFID tag is configured to transmit a first RFID signal upon manual contact with a first portion of the protective layer; and
a second manually activated RFID tag of the plurality of manually activated RFID tags disposed between the substrate and the protective layer, wherein the second manually activated RFID tag is configured to transmit a second RFID signal upon manual contact with a second portion of the protective layer,
wherein receiving the plurality of RFID signals from the at least one of the manually activated RFID tags of the first RFID device comprises:
receiving, at the RFID reader, the first RFID signal at a first time; and
receiving, at the RFID reader, the second RFID signal within the predetermined interval of the first time,
wherein the sequence is defined based at least in part on the first RFID signal, the first time, the second RFID signal and the predetermined interval of the first time.

20. The method of claim 17, wherein the plurality of manually activated RFID tags are provided in a layout corresponding to one of a keyboard or a keypad,
wherein each of the plurality of manually activated RFID tags is marked with at least one of an alphanumeric character, a symbol, or a string comprising the alphanumeric character or the symbol, and
wherein each of the plurality of manually activated RFID tags is configured to transmit an RFID signal associated with the alphanumeric character, the symbol or the string marked thereon.

21. The method of claim 17, wherein the transaction associated with the sequence comprises at least one of a container removal operation, a container transfer operation, a container placement operation, an item removal operation, an item transfer operation, or an item placement operation.

* * * * *